United States Patent
You et al.

(10) Patent No.: US 10,129,000 B2
(45) Date of Patent: Nov. 13, 2018

(54) METHOD AND TERMINAL FOR TRANSMITTING UPLINK CONTROL CHANNEL IN WIRELESS COMMUNICATION SYSTEM

(71) Applicant: LG ELECTRONICS INC., Seoul (KR)

(72) Inventors: Hyangsun You, Seoul (KR); Yunjung Yi, Seoul (KR); Suckchel Yang, Seoul (KR); Hanjun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 117 days.

(21) Appl. No.: 15/118,186

(22) PCT Filed: Mar. 2, 2015

(86) PCT No.: PCT/KR2015/001997
§ 371 (c)(1),
(2) Date: Aug. 11, 2016

(87) PCT Pub. No.: WO2015/133778
PCT Pub. Date: Sep. 11, 2015

(65) Prior Publication Data
US 2017/0180098 A1    Jun. 22, 2017

Related U.S. Application Data
(60) Provisional application No. 61/949,249, filed on Mar. 7, 2014.

(51) Int. Cl.
*H04W 72/04*    (2009.01)
*H04L 5/00*    (2006.01)
(Continued)

(52) U.S. Cl.
CPC .......... *H04L 5/0055* (2013.01); *H04L 5/0058* (2013.01); *H04W 74/04* (2013.01); *H04L 1/1864* (2013.01)

(58) Field of Classification Search
CPC ... H04L 1/1864; H04L 5/0055; H04L 5/0058; H04L 5/0005; H04L 5/0012;
(Continued)

(56) References Cited

U.S. PATENT DOCUMENTS

2012/0176965 A1    7/2012    Zhu et al.
2012/0269154 A1*   10/2012   Wang ............... H04W 72/1242
                                                                370/329
(Continued)

FOREIGN PATENT DOCUMENTS

| KR | 1020120069506 A | 6/2012 |
|---|---|---|
| KR | 1020130105882 A | 9/2013 |
| WO | 2013176462 A1 | 11/2013 |

OTHER PUBLICATIONS

Catt, "Details on (E)PDCCH coverage improvement for MTC UEs", 3GPP TSG RAN WG1 Meeting #76, R1-140077, Jan. 31, 2014, 2 pages.
(Continued)

*Primary Examiner* — Robert J Lopata
(74) *Attorney, Agent, or Firm* — Lee, Hong, Degerman, Kang & Waimey

(57) ABSTRACT

A disclosure of the present specification provides a method for transmitting a physical uplink control channel (PUCCH) by a terminal. The method may comprise the steps of: receiving multiple pieces of explicit configuration information on a PUCCH resource through higher layer signaling when a PUCCH should be repeatedly transmitted on a plurality of sub-frames; determining a PUCCH resource to which the PUCCH is transmitted, on the basis of the multiple pieces of the explicit configuration information;
(Continued)

and repeatedly transmitting, onto the determined PUCCH resource, the PUCCH on the plurality of sub-frames, wherein the PUCCH resource to which the PUCCH is transmitted is determined on the basis of one of a PDCCH, an EPDCCH, and an identification (ID) of the terminal, which have been received previously.

13 Claims, 21 Drawing Sheets

(51) Int. Cl.
*H04W 74/04* (2009.01)
*H04L 1/18* (2006.01)

(58) Field of Classification Search
CPC ....... H04L 5/0039; H04L 5/0041; H04L 5/06; H04W 74/04; H04J 1/00; H04J 1/08
USPC ......................................................... 370/480
See application file for complete search history.

(56) References Cited

U.S. PATENT DOCUMENTS

| | | |
|---|---|---|
| 2013/0272258 A1 | 10/2013 | Lee et al. |
| 2014/0098761 A1* | 4/2014 | Lee ..................... H04W 74/006 370/329 |
| 2015/0181533 A1* | 6/2015 | Chen ................... H04W 52/146 455/522 |
| 2015/0280876 A1* | 10/2015 | You ....................... H04L 5/0048 370/329 |
| 2016/0285535 A1* | 9/2016 | Kim ...................... H04L 5/0016 |
| 2016/0338110 A1* | 11/2016 | Wang .................... H04L 1/1825 |
| 2016/0353440 A1* | 12/2016 | Lee ...................... H04W 4/005 |
| 2017/0012755 A1* | 1/2017 | Wang ....................... H04L 1/08 |
| 2017/0273027 A1* | 9/2017 | Kim .................... H04W 52/146 |

OTHER PUBLICATIONS

Panasonic, "(E)PDCCH coverage enhancement for MTC", 3GPP TSG RAN WG1 Meeting #76, R1-140501, Jan. 31, 2014, 5 pages.

* cited by examiner

METHOD AND TERMINAL FOR TRANSMITTING UPLINK CONTROL CHANNEL IN WIRELESS COMMUNICATION SYSTEM

CROSS-REFERENCE TO RELATED APPLICATIONS

This application is the National Stage filing under 35 U.S.C. 371 of International Application No. PCT/KR2015/001997, filed on Mar. 2, 2015, which claims the benefit of U.S. Provisional Application No. 61/949,249, filed on Mar. 7, 2014, the contents of which are all hereby incorporated by reference herein in their entirety.

BACKGROUND OF THE INVENTION

Field of the Invention

The present invention relates to mobile communication.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Meanwhile, research on communication that is carried out between devices or between a device and a server without any human interaction, i.e., without any human intervention, i.e., machine type communication (MTC) has recently been extensively carried out. MTC refers to a concept of establishing communication between mechanical devices, and not equipments used by humans, by using the conventional wireless communication network.

Since the characteristics of the MTC are different from general user equipments, services that are optimized for the MTC may be different from services that are optimized for human-to-human communication. In comparison with the current Mobile Network Communication Service, the MTC can be characterized as different market scenarios, data communication, lower cost and less effort, a potentially large number of MTC devices, wider service areas, lower traffic per MTC device, and so on.

Recently, enhancing (or extending) the cell coverage of a base station has been considered, and diverse methods for cell coverage extension (or cell coverage enhancement) are being discussed. However, in case the coverage of the cell is extended (or enhanced) if the base station transmits a channel as when performing transmission to a general UE, a MTC device that is located in the cell coverage enhancement region may have difficulty in receiving the transmitted channel.

Additionally, it may be expected that the MTC devices have low performance in order to have its supply rate increased at lower costs. And, in case of transmitting the PDCCH, EPDCCH or PDSCH just as when transmitting to a general user equipment, the MTC device that is located in the cell coverage enhancement region may have difficulty in receiving the transmitted channel.

Additionally, in case the MTC device transmits PUCCH and PUSCH, which correspond to uplink channels, by using a general method, the base station may have difficulty in receiving the transmitted channel from the MTC device, which is located in the cell coverage enhancement region.

SUMMARY OF THE INVENTION

The present invention has been made in an effort to solve the above-discussed problem.

To achieve the foregoing aspect, a method according to a disclosure of the present specification is a method for a terminal to transmit a physical uplink control channel (PUCCH), which may include: receiving a plurality of explicit configuration information on a PUCCH resource through higher-layer signaling when a PUCCH needs to be repeatedly transmitted on a plurality of subframes; determining a PUCCH resource for transmitting the PUCCH based on the plurality of explicit configuration information; and repeatedly transmitting the PUCCH on the determined PUCCH resource over the plurality of subframes, wherein the PUCCH resource for transmitting the PUCCH may be determined based on at least one of a PDCCH, an EPDCCH, and an identification (ID) of the terminal, which are previously received.

Further, a previously received physical downlink shared channel (PDSCH) may be scheduled by the previously received PDCCH or EPDCCH, and the PUCCH may include ACK/NACK information in response to the previously received PDSCH.

Further, the previously received PDCCH or EPDCCH may be repeatedly transmitted on a plurality of downlink subframes according to a repetition level, the previously received PDCCH may be received by monitoring a plurality of PDCCH candidates, and the previously received EPDCCH may be received by monitoring a plurality of EPDCCH candidates.

Further, the PUCCH resource for transmitting the PUCCH may be determined based on a total aggregate resource (TAR) value for a PDCCH candidate from which the previously received PDCCH is retrieved among the plurality of PDCCH candidates, and the TAR value for the PDCCH candidate may be determined based on a repetition level and the number of resources per subframe for the previously received PDCCH.

Further, the PUCCH resource for transmitting the PUCCH may be determined based on a maximum TAR value for the plurality of PDCCH candidates, the maximum TAR value may be a TAR value having a maximum value among respective TAR values for the plurality of PDCCH candidates, and the respective TAR values for the plurality of PDCCH candidates may be determined based on repetition levels and numbers of resources per subframe respectively for the plurality of PDCCH candidates.

Further, the ID of the terminal may be a cell radio network temporary identifier (C-RNTI).

Further, the PUCCH resource for transmitting the PUCCH may be determined based on a location of a first control channel element (CCE) of the previously received PDCCH or a first enhanced CCE (ECCE) of the previously received EPDCCH.

Further, the PUCCH resource for transmitting the PUCCH may be randomly determined based on a predetermined random sequence whenever a PUCCH transmission event occurs.

Further, the PUCCH resource for transmitting the PUCCH may be maintained the same while the PUCCH is repeatedly transmitted on the plurality of subframes.

Further, the random sequence may be determined based on a subframe index or system frame number (SFN).

Further, the random sequence may be a random sequence initialized based on at least one of the PDCCH, EPDCCH, and ID of the terminal, which are previously received.

To achieve the foregoing aspect, a terminal according to one disclosure of the present specification, which transmits a PUCCH, may include: an RF unit to receive a plurality of explicit configuration information on a PUCCH resource through higher-layer signaling when a PUCCH needs to be repeatedly transmitted on a plurality of subframes; and a processor to control the RF unit to determine a PUCCH resource for transmitting the PUCCH based on the plurality of explicit configuration information and to repeatedly transmit the PUCCH on the determined PUCCH resource over the plurality of subframes, wherein the PUCCH resource for transmitting the PUCCH may be determined based on at least one of a PDCCH, an EPDCCH, and an ID of the terminal, which are previously received.

According to the disclosure of this specification, the above-described problems of the related art may be resolved. Most particularly, according to the disclosure of this specification, the reception performance and the decoding performance of a MTC device (Machine Type Communication) device, which is positioned in a coverage enhancement region of a base station, may be enhanced.

DESCRIPTION OF EXEMPLARY EMBODIMENTS

Figure 1:
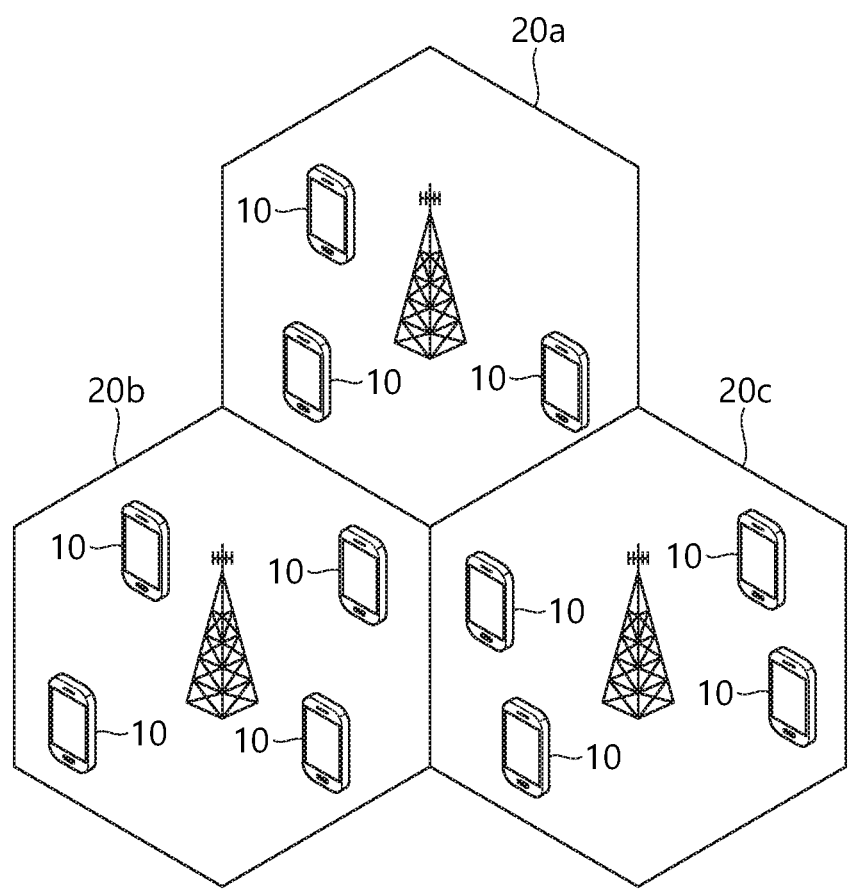
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively determined based on the UE.

Hereinafter, a downlink means communication from the base station 20 to the UE 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a sub-frame, the uplink transmission and the downlink transmission are performed in different sub-frames.

Hereinafter, the LTE system will be described in detail.

Figure 2:
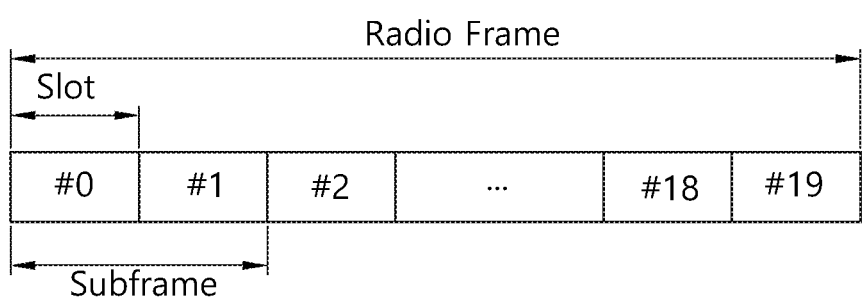
FIG. 2 illustrates a structure of a radio frame according to an FDD in a 3GPP LTE.

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

Meanwhile, one slot may include a plurality of orthogonal frequency division multiplexing (OFDM) symbols. The number of OFDM symbols included in one slot may vary depending on a cyclic prefix (CP). One slot includes 7 OFDM symbols in case of a normal CP, and one slot includes 6 OFDM symbols in case of an extended CP. Herein, since the 3GPP LTE uses orthogonal frequency division multiple access (OFDMA) in a downlink (DL), the OFDM symbol is only for expressing one symbol period in a time domain, and there is no limitation in a multiple access scheme or terminologies. For example, the OFDM symbol may also be referred to as another terminology such as a single carrier frequency division multiple access (SC-FDMA) symbol, a symbol period, etc.

Figure 3:
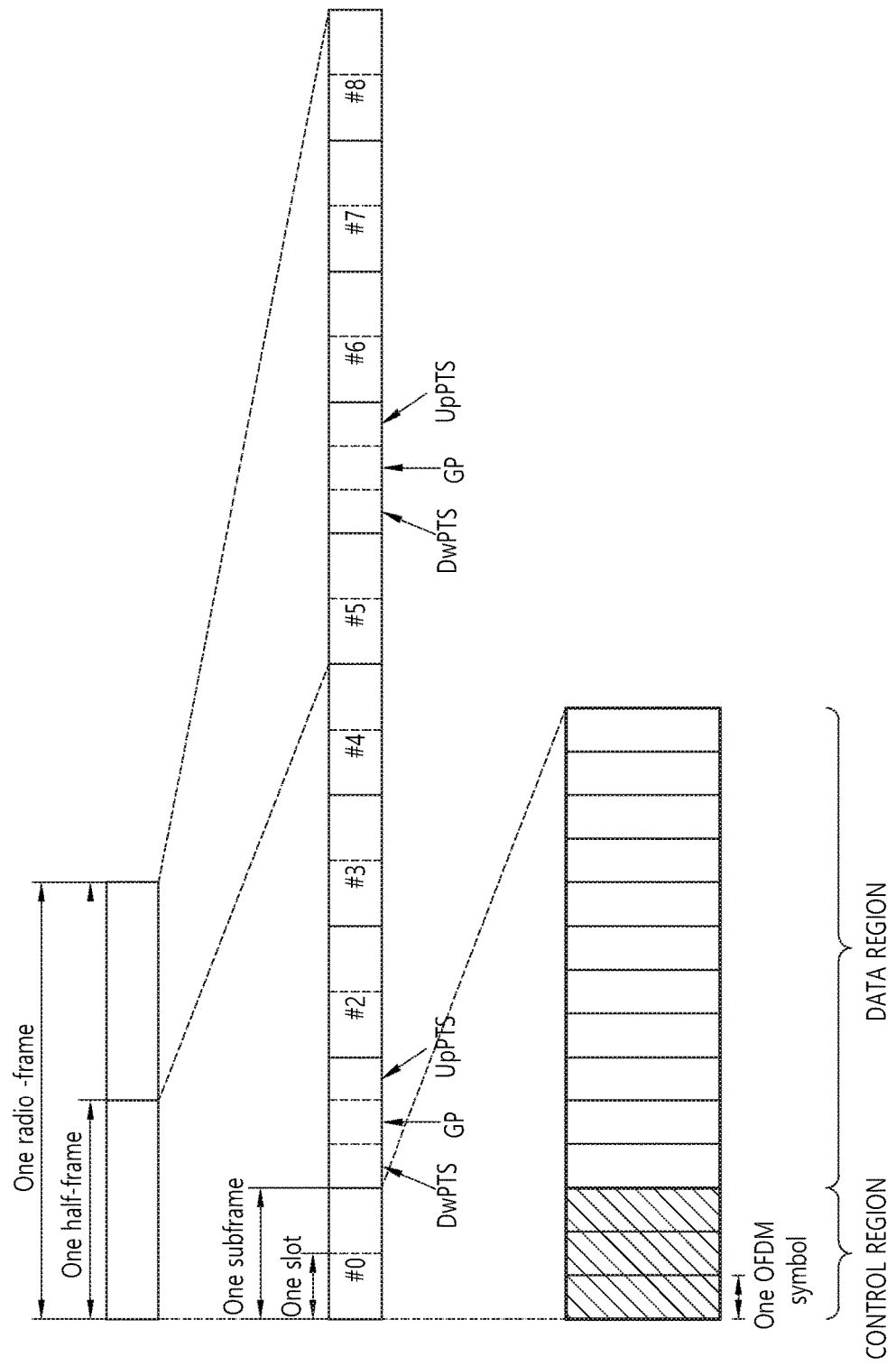
FIG. 3 illustrates the architecture of a downlink radio frame according to TDD in 3GPP LTE.

FIG. 3 illustrates the architecture of a downlink radio frame according to TDD in 3GPP LTE.

For this, 3GPP TS 36.211 V8.7.0 (2009-05) "Evolved Universal Terrestrial Radio Access (E-UTRA); Physical Channels and Modulation (Release 8)", Ch. 4 may be referenced, and this is for TDD (time division duplex).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL configu-raiton | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |

TABLE 1-continued

| UL-DL configu- raiton | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

Figure 4:
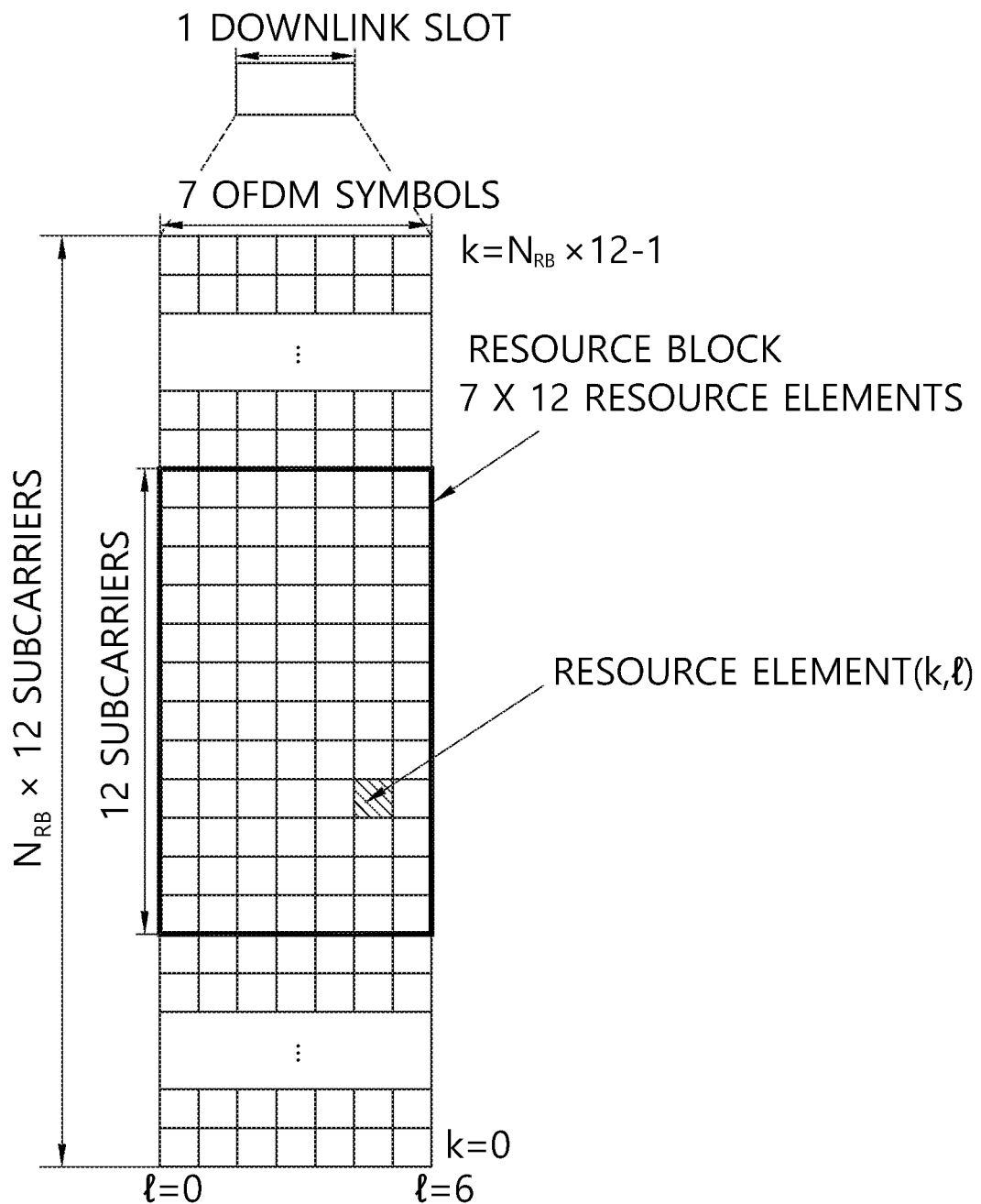
FIG. 4 is an exemplary diagram illustrating a resource grid with respect to one uplink or downlink slot in a 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., $N_{RB}$, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

Figure 5:
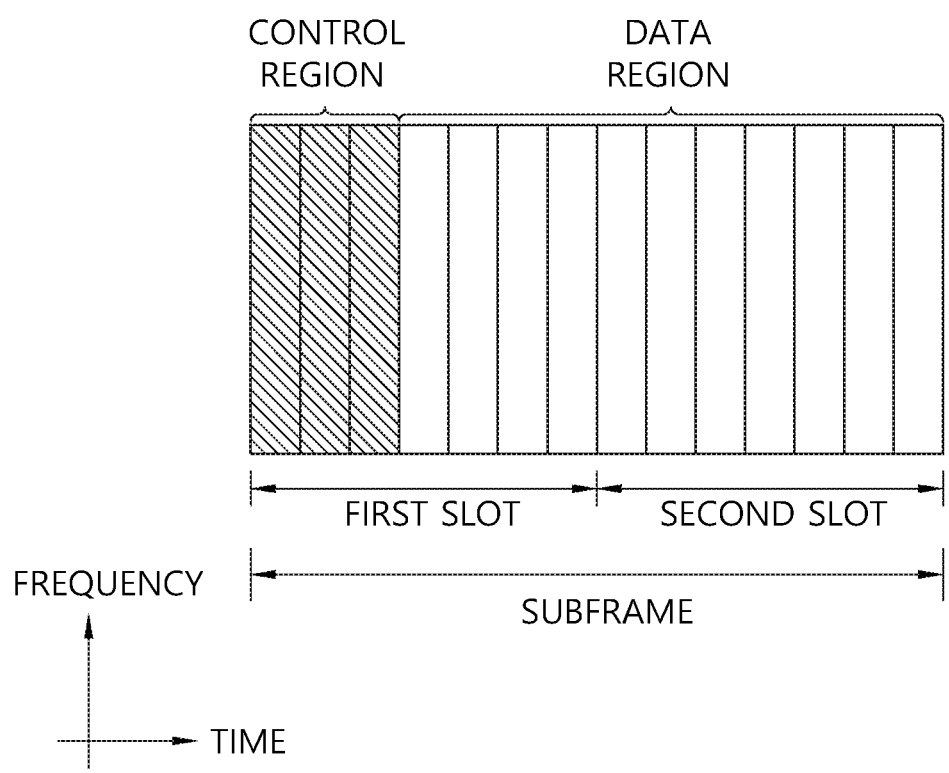
FIG. 5 illustrates the architecture of a downlink subframe.

FIG. 5 illustrates the architecture of a downlink sub-frame.

In FIG. 5, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

Control information transmitted through the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group, and/or activation of a voice over Internet protocol (VoIP).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

Figure 6:
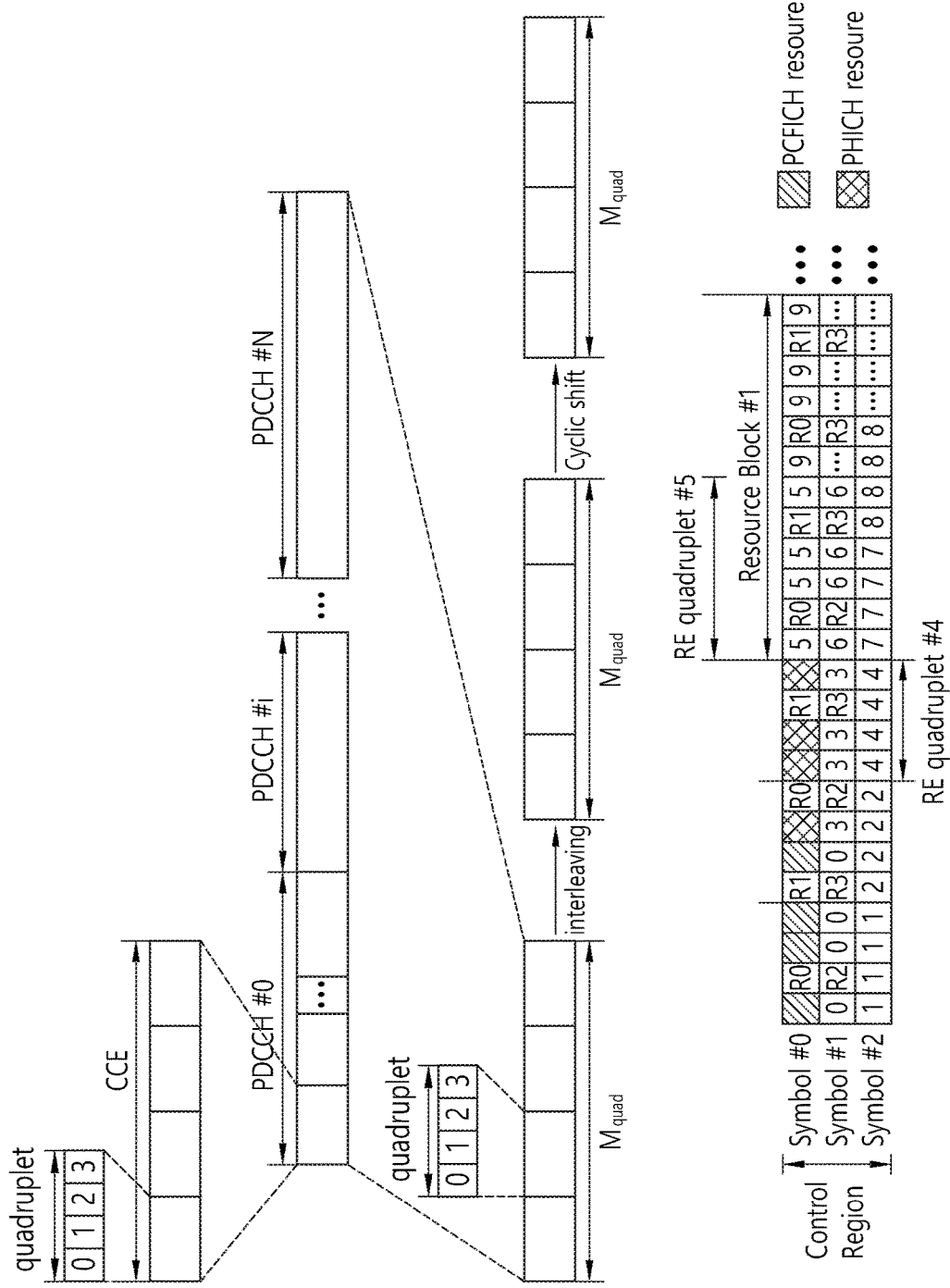
FIG. 6 illustrates an exemplary of resource mapping of a PDCCH.

FIG. 6 illustrates an exemplary of resource mapping of a PDCCH.

R0 indicates a reference signal of a first antenna, R1 indicates a reference signal of a second antenna, R2 indicates a reference signal of a third antenna, and R3 indicates a reference signal of a fourth antenna.

A control region within a subframe includes a plurality of CCEs (control channel elements). A CCE refers to a logical allocation unit that is used for providing the PDCCH with a coding rate respective to the state of the radio channel, and the CCE corresponds to a plurality of REGs (resource element groups). A REG includes a plurality of resource elements. Depending on the co-relation between the number of CCEs and a coding rate that is being provided by the CCEs, a format of the PDCCH and a number of bits of an available PDCCH are determined.

The number of CCEs that is used for the transmission of the PDCCH is determined by the base station in accordance with the channel state. For example, for a user equipment having a good downlink channel state, one CCE may be used for the PDCCH transmission. For a user equipment having a poor downlink channel state, 8 CCEs may be used for the PDCCH transmission.

One REG (being indicated as a quadruplet in the drawing) includes 4 REs, and one CCE includes 9 REGs. In order to configured one PDCCH, {1, 2, 4, 8} CCEs may be used, and each of the elements {1, 2, 4, 8} is referred to as a CCE aggregation level.

A control channel that is configured of one or more CCEs performs REG-unit interleaving and, then, is mapped to a physical resource after having a cell-ID based cyclic shift performed thereon.

Figure 7:
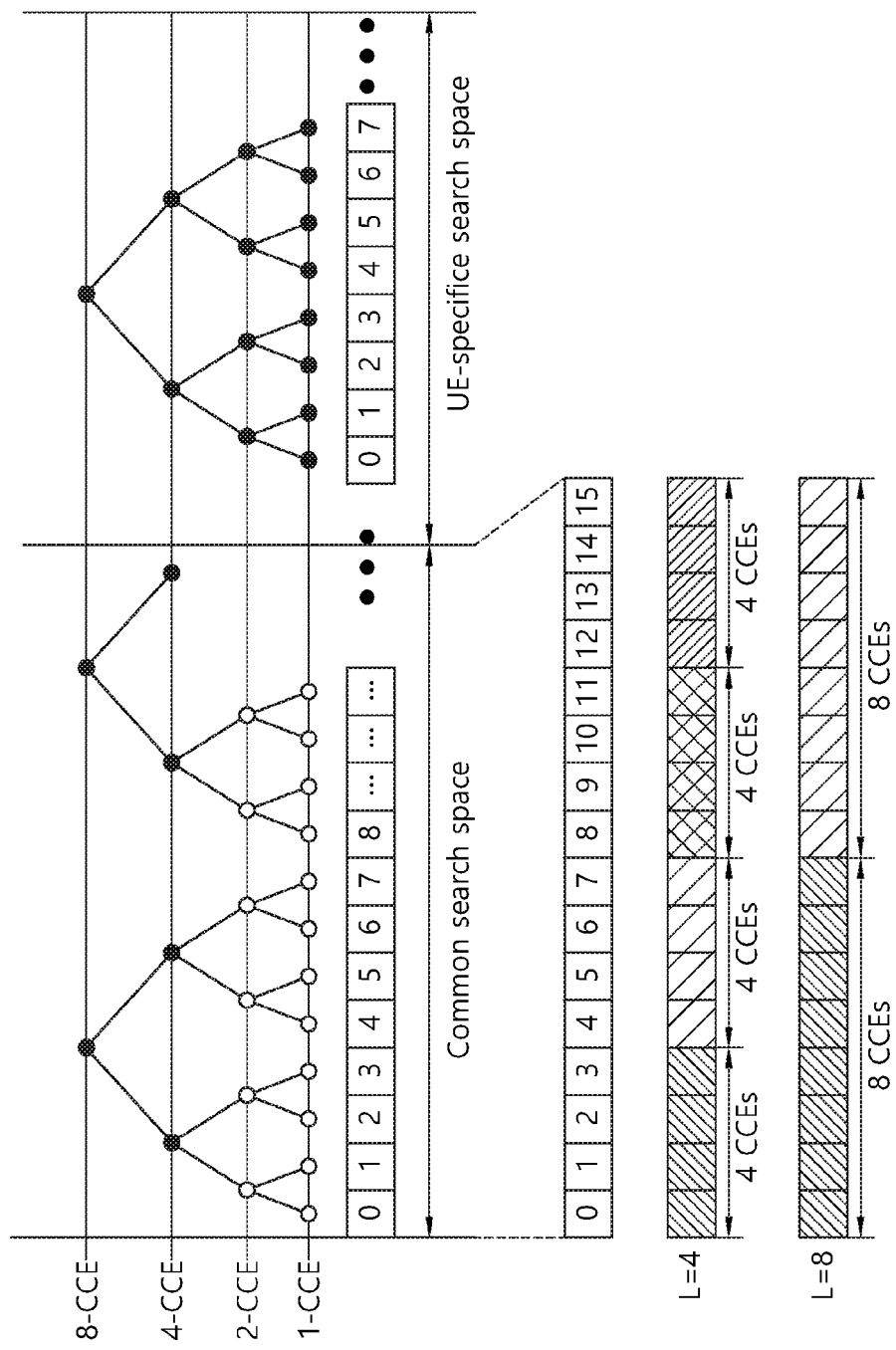
FIG. 7 illustrates an exemplary diagram showing monitoring of the PDCCH.

FIG. 7 illustrates an exemplary diagram showing monitoring of the PDCCH.

The user equipment is incapable of knowing from which location within the control region its PDCCH is being transmitted and by using which CCE aggregation level or DCI format. Since multiple PDCCHs may be transmitted within one subframe, the user equipment monitors multiple PDCCHs for each subframe. Herein, monitoring refers to the user equipment attempting to decode the PDCCH in accordance with the PDCCH format.

In 3GPP LTE, in order to reduce any load (or burden) caused by blind decoding, a search space is used. The search space may also be referred to as a monitoring set of the CCE for the PDCCH. The user equipment monitors the PDCCH within the corresponding search space.

The search space is divided into a common search space and a UE-specific search space. The common search space corresponds to a space searching a PDCCH having common control information, and the common search space is configured of 16 CCEs corresponding to CCE indexes 0~15 and supports a PDCCH having a CCE aggregation level of {4, 8}. However, a PDCCH (DCI formats 0 and 1A) carrying UE-specific information may also be transmitted to the common search space. The UE-specific search space supports a PDCCH having a CCE aggregation level of {1, 2, 4, 8}.

Table 2 shown below indicates a number of PDCCH candidates being monitored by a wireless device.

TABLE 2

| Search space $S^{(L)}_k$ | | | Number of PDCCH candidates $M^{(L)}$ |
|---|---|---|---|
| Type | Aggregation Level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

The size of the search space is determined by Table 2, and the starting point of the search space is defined differently for the common search space and the UE-specific search space. Although the starting point of the common search space is fixed regardless of the subframe, the starting point of the UE-specific search space may vary for each subframe in accordance with a UE identifier (e.g., C-RNTI), a CCE aggregation level, and/or a slot number within a radio frame. In case the starting point of the UE-specific search space is located within the common search space, the UE-specific search space and the common search space may overlap one another.

In the aggregation level L∈{1, 2, 4, 8}, the search space $S^{(L)}_k$ is defined as a set (or group) of PDCCH candidates. The CCE corresponding to PDCCH candidate m of the search space $S^{(L)}_k$ is given as described below.

$$L\{(Y_k+m') \mod \lfloor N_{CCE,k}/L \rfloor\}+i \qquad [\text{Equation 1}]$$

Herein, i=0, 1, . . . , L−1, m=0, . . . , $M^{(L)}$−1, and $N_{CCE,k}$ represents a total number of CCEs that can be used for the transmission of the PDCCH within the control region of subframe k. The control region includes a set of CCEs being numbered from 0 to $N_{CCE,k}$−1. $M^{(L)}$ represents a number of PDCCH candidates at CCE aggregation level L in a given search space.

When a CIF (carrier indicator field) is configured in a wireless device, then, m'=m+$M^{(L)}n_{cif}$. $n_{cif}$ represents a value of the CIF. If the CIF is not configured in the wireless device, then, m'=m.

In the common search space, $Y_k$ is set (or configured) to 0 with respect to 2 aggregation levels L=4 and L=8.

In the UE-specific search space of the aggregation level L, the variable $Y_k$ is defined as described below.

$$Y_k=(A \cdot Y_{k-1}) \mod D \qquad [\text{Equation 2}]$$

Herein, $Y_{-1}=n_{RNTI} \neq 0$, A=39827, D=65537, k=floor($n_s/2$), and $n_s$ represents a slot number within a radio frame.

When the user equipment monitors the PDCCH based on the C-RNTI, the DCI format that is to be monitored and the search space are determined in accordance with the transmission mode of the PDSCH.

Meanwhile, when the user equipment monitors the PDCCH based on the C-RNTI, the DCI format that is to be monitored and the search space are determined in accordance with the transmission mode (TM) of the PDSCH. The following Table shows an example of monitoring the PDCCH having a C-RNTI configured therein.

TABLE 3

| Transmission Mode | DCI Format | Search Space | Transmission mode of PDSCH with respect to the PDCCH |
|---|---|---|---|
| Transmission Mode 1 | DCI Format 1A | Common and UE-specific | Single antenna port, Port 0 |
| | DCI Format 1 | UE-specific | Single antenna port, Port 0 |
| Transmission Mode 2 | DCI Format 1A | Common and UE-specific | Transmit diversity |
| | DCI Format 1 | UE-specific | Transmit diversity |

TABLE 3-continued

| Transmission Mode | DCI Format | Search Space | Transmission mode of PDSCH with respect to the PDCCH |
|---|---|---|---|
| Transmission Mode 3 | DCI Format 1A | Common and UE-specific | Transmit diversity |
| | DCI Format 2A | UE-specific | CDD(Cyclic Delay Diversity) or Transmit diversity |
| Transmission Mode 4 | DCI Format 1A | Common and UE-specific | Transmit diversity |
| | DCI Format 2 | UE-specific | Closed-loop spatial multiplexing |
| Transmission Mode 5 | DCI Format 1A | Common and UE-specific | Transmit diversity |
| | DCI Format 1D | UE-specific | MU-MIMO(Multi-user Multiple Input Multiple Output) |
| Transmission Mode 6 | DCI Format 1A | Common and UE-specific | Transmit diversity |
| | DCI Format 1B | UE-specific | Closed-loop spatial multiplexing |
| Transmission Mode 7 | DCI Format 1A | Common and UE-specific | If the number of PBCH transmission ports is equal to 1, Single antenna port, Port 0, if not, Transmit Diversity |
| | DCI Format 1 | UE-specific | Single antenna port, Port 5 |
| Transmission Mode 8 | DCI Format 1A | Common and UE-specific | If the number of PBCH transmission ports is equal to 1, Single antenna port, Port 0, if not, Transmit Diversity |
| | DCI Format 2B | UE-specific | Dual layer transmission (Port 7 or 8), or Single antenna port, Port 7 or 8 |
| Transmission Mode 9 | DCI Format 1A | Common and UE-specific | Non-MBSFN Subframe: If the number of PBCH antenna ports is equal to 1, Port 0 is used as a single antenna port, and, if not, Transmit Diversity<br>MBSFN Subframe: Port 7 as a single antenna port |
| | DCI Format 2C | UE-specific | Up to 8 transmission layers, Ports 7-14 are used, or Port 7 or Port 8 is used as a single antenna port |
| Transmission Mode 10 | DCI Format 1A | Common and UE-specific | Non-MBSFN Subframe: If the number of PBCH antenna ports is equal to 1, Port 0 is used as a single antenna port, and, if not, Transmit Diversity<br>MBSFN Subframe: Port 7 as a single antenna port |
| | DCI Format 2D | UE-specific | Up to 8 transmission layers, Ports 7-14 are used, or Port 7 or Port 8 is used as a single antenna port |

The purposes of the DCI formats are differentiated as shown in the following table.

TABLE 4

| DCI Format | Content |
|---|---|
| DCI Format 0 | Used for PUSCH scheduling |
| DCI Format 1 | Used for scheduling of one PDSCH codeword |
| DCI Format 1A | Used for compact scheduling of one PDSCH codeword and random access procedure |
| DCI Format 1B | Used for compact scheduling of one PDSCH codeword having precoding information |
| DCI Format 1C | Used for a very compact scheduling of one PDSCH codeword |
| DCI Format 1D | Used for compact scheduling of one PDSCH codeword having precoding and power offset information |
| DCI Format 2 | Used for PDSCH scheduling of user equipments that are set to the Closed-loop spatial multiplexing mode |
| DCI Format 2A | Used for PDSCH scheduling of user equipments that are set to the Open-loop spatial multiplexing mode |
| DCI Format 2B | DCI Format 2B is used for the resource allocation for dual-layer beamforming of the PDSCH. |
| DCI Format 2C | DCI Format 2C is used for the resource allocation for Closed-loop SU-MIMO or MU-MIMO operations of up to 8 layers. |
| DCI Format 2D | DCI Format 2D is used for the resource allocation of up to 8 layers. |
| DCI Format 3 | Used for the transmission of TPC commands of PUCCH and PUSCH having 2-bit power adjustments |
| DCI Format 3A | Used for the transmission of TPC commands of PUCCH and PUSCH having 1-bit power adjustments |

TABLE 4-continued

| DCI Format | Content |
|---|---|
| DCI Format 4 | Used for PUSCH scheduling of an uplink (UL) cell operating in the multiple antenna port transmission mode |

Figure 8:
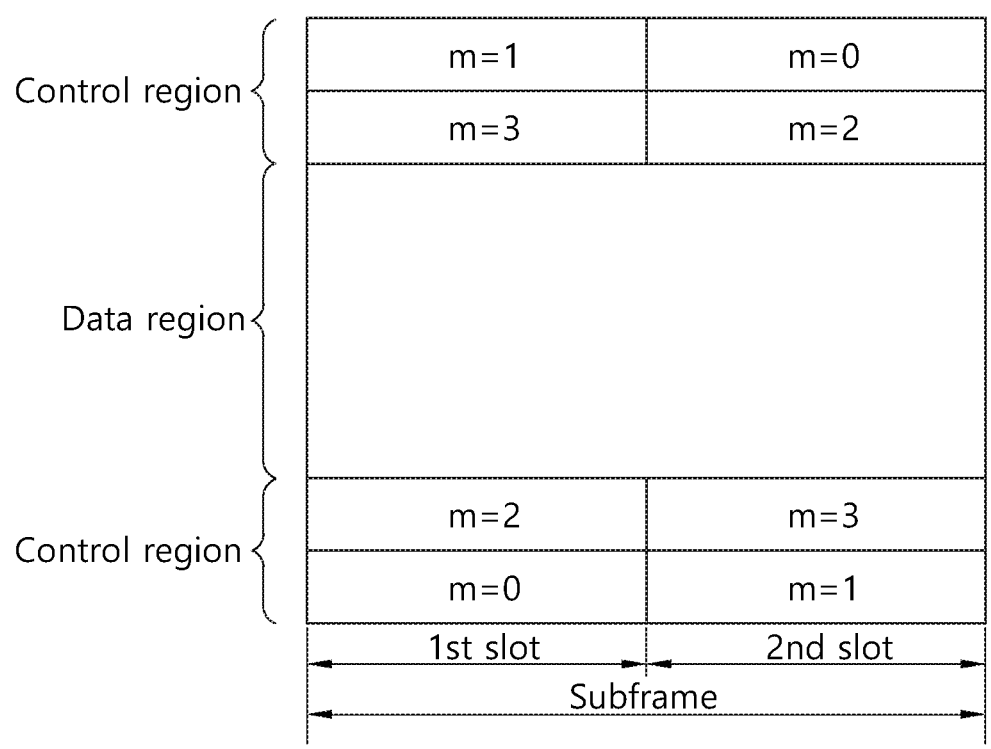
FIG. 8 illustrates a structure of an uplink subframe in 3GPP LTE.

FIG. 8 illustrates a structure of an uplink subframe in 3GPP LTE.

Referring to FIG. 8, an uplink subframe may be divided into a control region and a data region in a frequency domain. The control region is allocated with a PUCCH (Physical Uplink Control Channel) for transmitting uplink control information. The data region is allocated with a PUSCH (Physical Uplink Shared Channel) for transmitting data (in some cases, the control information may also be transmitted along with the data).

The PUCCH respective to one UE is allocated in resource block pairs (RB pairs) in a subframe. The resource blocks belonging to the resource block pair respectively occupy different sub-carriers within a first slot and a second slot. The frequency that is occupied by the resource blocks belonging to the resource block pair that is allocated to the PUCCH is varied based on the slot boundary. This is referred to as the RB pair that is allocated to the PUCCH as being frequency-hopped at the slot boundary.

By transmitting the uplink control information through different sub-carriers in accordance with time, the UE may obtain frequency diversity gain. m corresponds to a position index indicating a logical frequency domain position of a resource block pair that is allocated to the PUCCH within a subframe.

The uplink control information being transmitted over the PUCCH may include HARQ (hybrid automatic repeat request) ACK (acknowledgement)/NACK (non-acknowledgement), CQI (channel quality indicator) indicating a downlink channel state, SR (scheduling request), which corresponds to a request for uplink radio resource allocation, and so on.

The PUSCH is mapped to UL-SCH, which corresponds to a transport channel. Uplink data that are transmitted over the PUSCH may correspond to a transport block, which is a data block for the UL-SCH that is transmitted during a Transmission Time Interval (TTI). The transport block may correspond to user information. Alternatively, the uplink data may correspond to multiplexed data. The multiplexed data may correspond to a multiplexed result of the transport block for the UL-SCH and the control information. For example, the control information being multiplexed to the data mat include CQI, PMI (precoding matrix indicator), HARQ, RI (rank indicator), and so on. Alternatively, the uplink data may also be configured only of the control information.

Hereinafter, a carrier aggregation (CA) system will be described.

A carrier aggregation (CA) system refers to aggregating multiple component carriers (CCs). Due to such carrier aggregation, the significance of the conventional cell has changed. According to carrier aggregation, a cell may refer to a set of downlink component carrier and uplink component carrier, or a cell may refer to a single downlink component carrier.

Additionally, in carrier aggregation, a cell may be divided into a primary cell, a secondary cell, and a serving cell. A primary cell refers to a cell that operates in a primary frequency, or a cell through which the UE performs an initial connection establishment procedure or a connection re-establishment procedure with the base station, or a cell that is designated as a primary cell during a handover procedure. A secondary cell refers to a cell that operates in a secondary frequency, and, once the RRC connection is established, the secondary cell is configured and used for providing additional radio resources.

As described above, unlike the single carrier system, a carrier aggregation system may support multiple component carriers (CCs), i.e., multiple serving cells.

Such carrier aggregation system may support cross-carrier scheduling. Cross-carrier scheduling corresponds to a scheduling method that can perform resource allocation of a PDSCH through a PDCCH, which is transmitted through a specific component carrier, wherein the PDSCH is transmitted through another component carrier, or a scheduling method that can perform resource allocation of a PDSCH that is transmitted through a component carrier other than the component carrier being essentially linked to the specific component carrier.

Meanwhile, the PDCCH is monitored in a restricted (or limited) region, which is referred to as a control region, within a subframe, and, in order to perform demodulation of the PDCCH, a CRS that is transmitted in all bands is used. As the types of control information become more diverse, and as the size of the control information becomes larger, flexibility in the scheduling is degraded when only using the legacy PDCCH. Additionally, in order to reduce any burden caused by the CRS transmission, an EPDCCH (enhanced PDCCH) is being adopted.

Figure 9:
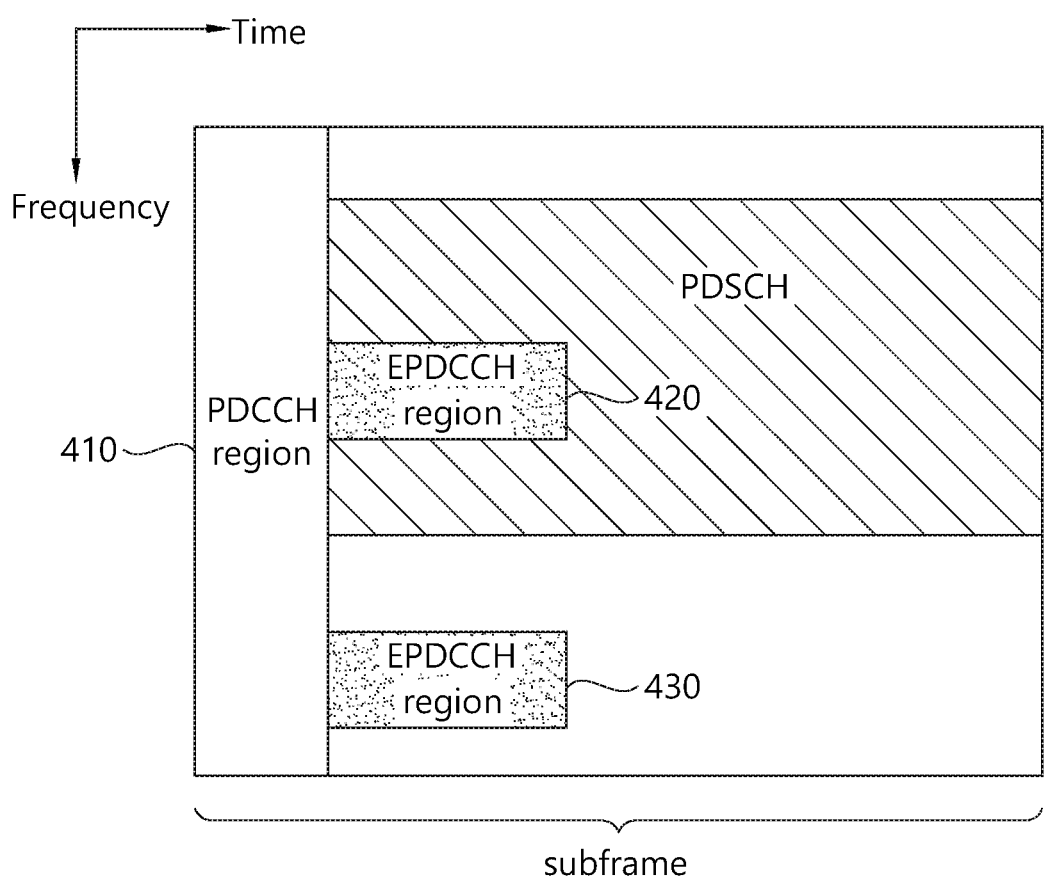
FIG. 9 illustrates an example of a subframe having an EPDCCH.

FIG. 9 illustrates an example of a subframe having an EPDCCH.

A subframe may include zero or one PDCCH region 410 and zero or more EPDCCH regions 420 and 430.

The EPDCCH regions 420 and 430 correspond to a region where the wireless device monitors the EPDCCH. Although the PDCCH region 410 is located within a maximum of 4 foremost OFDM symbols of the subframe, the EPDCCH regions 420 and 430 may be flexibly scheduled in the OFDM symbol after the PDCCH region 410.

One or more EPDCCH regions 420 and 430 are designated in a wireless device), and the wireless device may monitor the EPDCCH from the designated EPDCCH regions 420 and 430.

The number/location/size of the EPDCCH regions 420 and 430 and/or information on the subframe that is to monitor the EPDCCH may be notified by the base station to the wireless device through a RRC message, and so on.

In the PDCCH region 410, the PDCCH may be demodulated based on the CRS. In the EPDCCH regions 420 and 430, a DM (demodulation) RS may be defined instead of the CRS for the demodulation of the EPDCCH. An associated DM RS may be transmitted from the corresponding EPDCCH regions 420 and 430.

A RS sequence $r_{ns}(m)$ for the associated DM RS is as shown below in Equation 3.

$$r_{l,ns}(m) = \frac{1}{\sqrt{2}}(1 - 2 \cdot c(2m)) + j\frac{1}{\sqrt{2}}(1 - 2 \cdot c(2m+1)) \quad \text{[Equation 3]}$$

Herein, m=0, 1, ..., $2N_{maxRB}-1$, $N_{maxRB}$ signifies a maximum number of RBs, ns represents a slot number within a radio frame, and l signifies an OFDM symbol number within a slot.

A pseudo-random sequence c(i) is defined by a Gold sequence having a length of 31, which is shown below.

At this point, m=0, 1, ..., $12N_{RB}-1$, and $N_{RB}$ corresponds to a maximum number of RBs. A pseudo-random sequence generator may be initiated to $c_{init}$=(floor(ns/2)+1)$(2N_{EPDCCH,ID}+1)2^{16}+n_{EPDCCH,SCID}$ from the beginning of each subframe. ns represents a slot number within the radio frame, $N_{EPDCCH,ID}$ corresponds to a value that is associated with the EPDCCH set and is given from higher layer signaling, and $n_{EPDCCH,SCID}$ may be given as a specific value.

Each of the EPDCCH regions 420 and 430 may be used for the scheduling of cells that are different from one another. For example, the EPDCCH within the EPDCCH region 420 may carry scheduling information for the primary cell, and the EPDCCH of the EPDCCH region 430 may carry scheduling information for the secondary cell.

In the EPDCCH regions 420 and 430, when the EPDCCH is transmitted through multiple antennas, pre-coding that is identical to that of the EPDCCH may be applied to the DM RS within the EPDCCH regions 420 and 430.

In comparison with the PDCCH using the CCE in transmission resource units, the transmission resource unit for the EPCCH is referred to as an ECCE (Enhanced Control Channel Element). The aggregation level may be defined as a resource unit that monitors the EPDCCH. For example, when 1 ECCE is said to be the minimum resource for the EPDCCH, the aggregation level may be defined as L={1, 2, 4, 8, 16}.

Hereinafter, the EPDCCH search space may correspond to the EPDCCH region. In the EPDCCH search space, one or more EPDCCH candidates may be monitored for one or more aggregation levels.

Hereinafter, the resource allocation for the EPDCCH will be described in detail.

The EPDCCH is transmitted by using one or more ECCEs. An ECCE includes multiple EREGs (Enhanced Resource Element Groups). In accordance with the subframe type and CP respective to the TDD (Time Division Duplex) DL-UL configuration, an ECCE may include 4 EREGs or 8 EREGs. For example, in a normal CP, the ECCE may include 4 EREGs, and, in an extended CP, the ECCE may include 8 EREGs.

A PRB (Physical Resource Block) pair refers to two PRBs having the same RB number within one subframe. A PRB pair refers to a first PRB of a first slot and a second PRB of a second slot within the same frequency domain. In the normal CP, a PRB pair includes 12 sub-carriers and 14 OFDM symbols, and, therefore, includes 168 REs (resource elements).

Figure 10:
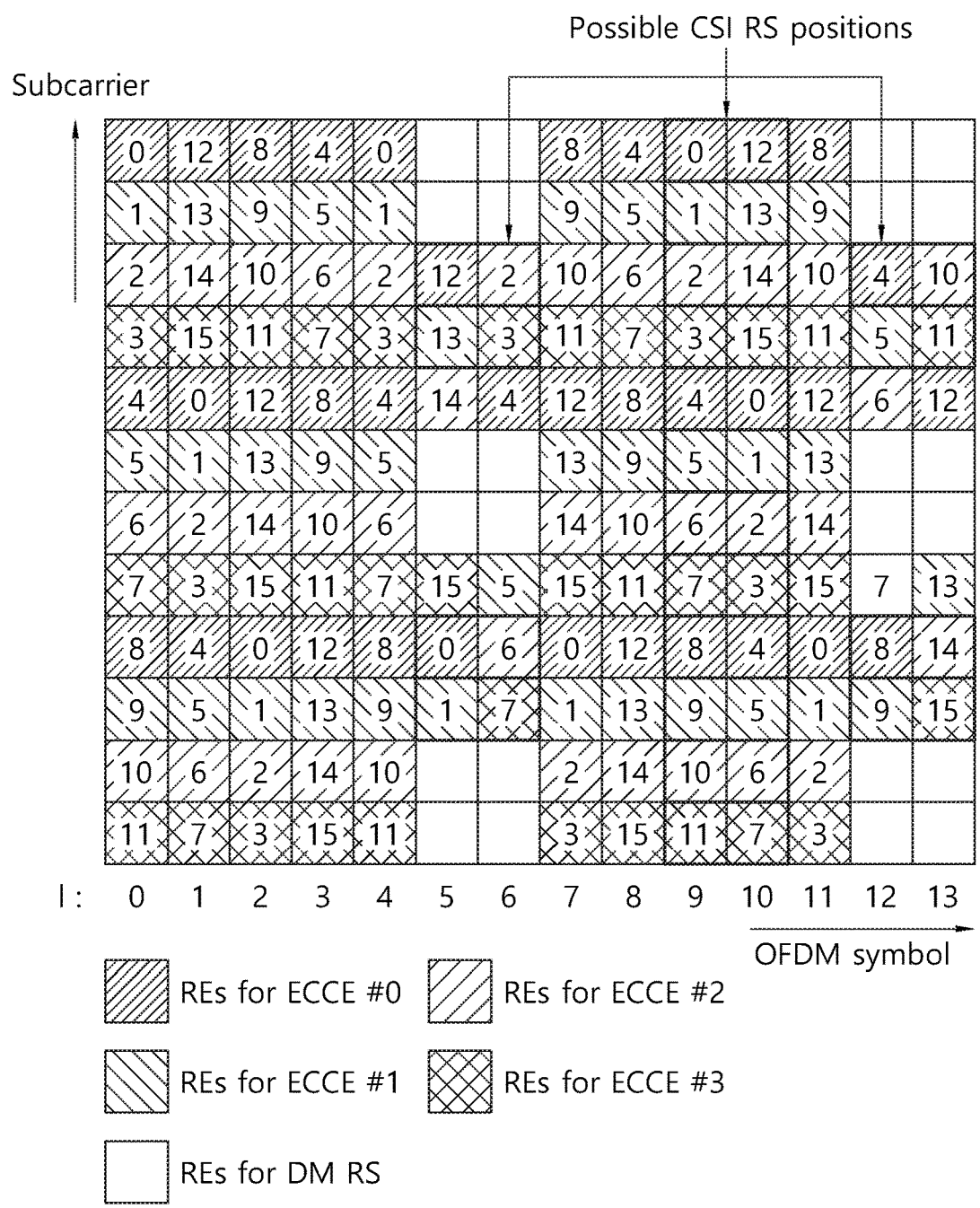
FIG. 10 illustrates an example of a PRB pair.

FIG. 10 illustrates an example of a PRB pair.

Hereinafter, a subframe includes 2 slots, and, in one slot, although it is said that a PRB pair includes 7 OFDM symbols and 12 sub-carriers, the number of OFDM symbols and the number of sub-carriers are merely exemplary.

In one subframe, a PRB pair has a total of 168 REs. With the exception for the 24 REs for the DM RS, 16 EREGs are configured from 144 REs. Accordingly, 1 EREG may include 9 REs. However, apart from the DM RS, a CSI-RS or CRS may be positioned in one PRB pair. In this case, the number of available REs may be reduced, and the number of REs being included in 1 EREG may be reduced. Although the number of REs being included in an EREG may vary, the number of EREGs being included in one PRB pair, 16, does not vary.

At this point, as shown in FIG. 10, for example, RE indexes may be sequentially assigned starting from a first upper sub-carrier of a first left-side OFDM symbol (l=0) (or RE indexes may be sequentially assigned upward starting from a first lower sub-carrier of a first left-side OFDM symbol (l=0)). It will be assumed that indexes starting from 0 to 15 are assigned to 16 EREGs. At this point, 5 REs having RE index 0 are allocated to EREG 0. Similarly, 9 REs corresponding to RE index k(k=0, ..., 15) are allocated to EREG k.

By grouping multiple EREGs, an EREG group is defined. For example, when an EREG group having 4 EREGs is defined, the EREG groups may be defined as EREG group #0={EREG 0, EREG 4, EREG 8, EREG 12}, EREG group #1={EREG 1, EREG 5, EREG 9, EREG 3}, EREG group #2={EREG 2, EREG 6, EREG 10, EREG 14}, and EREG group #3={EREG 3, EREG 7, EREG 11, EREG 15}. When defining an EREG group having 8 EREGs, the EREG groups may be defined as EREG group #0={EREG 0, EREG 2, EREG 4, EREG 6, EREG 8, EREG 10, EREG 12, EREG 14}, and EREG group #1={EREG 1, EREG 3, EREG 5, EREG 7, EREG 9, EREG 11, EREG 13, EREG 15}.

As described above, an ECCE includes 4 EREGs, and, in an extended CP, an ECCE may include 8 EREGs. An ECCE is defined by an EREG group. For example, FIG. 6 shows an example wherein ECCE #0 includes EREG group #0, wherein ECCE #1 includes EREG group #1, wherein ECCE #2 includes EREG group #2, and wherein ECCE #3 includes EREG group #3.

In ECCE-to-EREG mapping, there are two types: localized transmission and distributed transmission. In the localized transmission, an EREG group configuring one ECCE is selected from an EREG within a PRB pair. In the distributed transmission, an EREG group configuring one ECCE is selected from EREGs of different PRB pairs.

Figure 11:
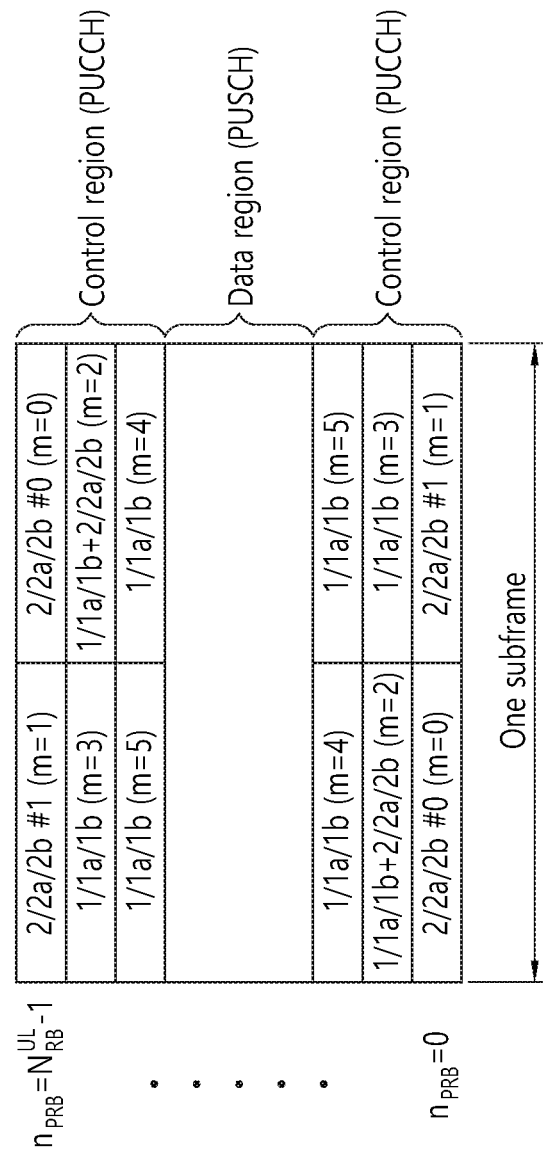
FIG. 11 illustrates a PUCCH and a PUSCH within an uplink subframe.

FIG. 11 illustrates a PUCCH and a PUSCH within an uplink subframe.

Uplink control information (UCI) may be transmitted over the PUCCH. At this point, the PUCCH carries diverse types of control information. The UCI includes HARQ ACK/NACK, SR(Scheduling Request), and channel status information (CSI), which indicates the state of the downlink channel.

PUCCH Format 1 carries a SR (Scheduling Request). At this point, an OOK (On-Off Keying) method may be applied. PUCCH Format 1a carries an ACK/NACK (Acknowledgement/Non-Acknowledgement), which is modulated by using a BPSK (Binary Phase Shift Keying) scheme with respect to one codeword. PUCCH Format 1b carries an ACK/NACK, which is modulated by using QPSK (Quadrature Phase Shift Keying) scheme with respect to two codewords. PUCCH Format 2 carries a CQI (Channel Quality Indicator), which is modulated by using the QPSK scheme. PUCCH Formats 2a and 2b carry CQI and ACK/NACK.

Table 5 shows a PUCCH format.

TABLE 5

| Format | Description |
| --- | --- |
| Format 1 | Scheduling Request (SR) |
| Format 1a | ACK/NACK of a 1-bit HARQ, Scheduling Request (SR) may exist or may not exist |

TABLE 5-continued

| Format | Description |
| --- | --- |
| Format 1b | ACK/NACK of a 2-bit HARQ, Scheduling Request (SR) may exist or may not exist |
| Format 2 | CSI (20 code bits) |
| Format 2 | In case of an extended CP, CSI and 1-bit or 2-bit HARQ ACK/NACK |
| Format 2a | CSI and 1-bit HARQ ACK/NACK |
| Format 2b | CSI and 2-bit HARQ ACK/NACK |
| Format 3 | Multiple ACK/NACKs for carrier aggregation |

Each PUCCH Format is mapped to the PUCCH region and then transmitted accordingly. For example, PUCCH Format 2/2a/2b is mapped to a resource block (m=0, 1 in FIG. 8) located at an edge portion of the band that is allocated to the user equipment and then transmitted accordingly. A mixed PUCCH RB may be mapped to a neighboring resource block (e.g., m=2), which is adjacent to the resource block to which the PUCCH Format 2/2a/2b are allocated toward the center of the band, and transmitted accordingly. The PUCCH Format 1/1a/1b through which the SR and ACK/NACK are transmitted may be positioned to the resource block corresponding to m=4 or m=5. The number of resource blocks (N(2)RB), which may be used in the PUCCH Format 2/2a/2b through which the CQI is transmitted, may be indicated to the user equipment through a signal that is being broadcasted. The PUCCH Format 3 is used for carrying a 48-bit encoded UCI. The PUCCH Format 3 may carry HARQ ACK/NACK respective to multiple serving cells and a CSI report respective to one serving cell. The PUCCH Format 3 performs transmission based on block spreading. More specifically, the PUCCH Format 3 spreads (or disperses) a modulation symbol sequence, wherein a multiple-bit ACK/NACK is modulated, in the time domain by using a block spreading code and then transmits the spread sequence.

The above-described CSI refers to an indicator indicating the state of the DL channel, and the CSI may include at least one of a CQI (Channel Quality Indicator) and a PMI (Precoding Matrix Indicator). Additionally, a PTI (precoding type indicator), a RI (rank indication), and so on, may also be included.

The CQI provides information on a link adaptive parameter that can be supported by the user equipment with respect to a given time. The CQI may designate a data rate, which can be supported by a downlink channel, based on the characteristics and SINR (signal to interference plus noise ratio) of a user equipment receiver. The base station may decide a modulation (QPSK, 16-QAM, 64-QAM, and so on) and a coding rate that are to be applied to the downlink channel by using the CQI. The CQI may be generated by using diverse methods. For example, there is a method of performing feedback by quantizing the channel state without any modification, a method of performing feedback by calculating the SINR (signal to interference plus noise ratio), a method of notifying a state that is actually being applied to the channel, such as a MCS (Modulation Coding Scheme), and so on. In case the CQI is generated based on the MCS, the MCS includes the modulation scheme, the coding method, and the respective coding rate, and so on.

The PMI provides information on a precoding matrix during the precoding of a codebook base. The PMI is associated with MIMO (multiple input multiple output). The PMI being fed-back in MIMO is referred to as closed loop MIMO.

The RI corresponds to information on a number of layers recommended by the user equipment. More specifically, the RI indicates a number of independent streams that are used for spatial multiplexing. The RI is fed-back only in a case when the user equipment is operated in the MIMO mode using spatial multiplexing. The RI is always associated with one or more CQI feedback. More specifically, the CQI that is being fed-back is calculated by assuming a specific RI value. Since the rank of a channel generally varies at a slower rate as compared to the CQI, the RI is fed-back for a number of times that is slower than the CQI. The transmission cycle period (or period) of the RI may be the multiple of the CQI/PMI transmission period. The RI is given with respect to the entire system band, and a frequency selective RI feedback is not supported.

As described above, the PUCCH is only used for the transmission of the UCI. For this, the PUCCH supports multiple Formats. Depending on the modulation scheme that belongs to the PUCCH Format, a PUCCH having different number of bits for each subframe may be used.

Meanwhile, the PUSCH that is shown in the drawing is mapped to a UL-SCH (Uplink Shared Channel), which is the transport channel. Uplink data that are transmitted over the PUSCH may correspond to a transport block, which is a data block for the UL-SCH that is being transmitted during a TTI. The transport block may include user data. Alternatively, the uplink data may correspond to multiplexed data. The multiplexed data may correspond to data having a transport block and channel state information of a UL-SCH (uplink shared channel) multiplexed therein. For example, the channel state information (CSI) that is being multiplexed in the data may include CQI, PMI, RI, and so on. Alternatively, the uplink data may only be configured of the channel state information. Periodic or aperiodic channel state information may be transmitted through the PUSCH.

The PUSCH is allocated by a UL grant within the PDCCH. Although it is not shown in the drawing, a $4^{th}$ symbol of each slot in a normal CP is used for the transmission of a DM RS (Demodulation Reference Signal) for the PUSCH.

Meanwhile, a hybrid automatic repeat request (HARQ) may be used for a wireless communication system. HARQ is a scheme in which a transmitter receives an acknowledgement/non-acknowledgement (ACK/NACK) as receipt notification information relating to data after transmitting the data and transmits new data or retransmits previously transmitted data according to the ACK/NACK.

In 3GPP LTE/LTE-A, an ACK/NACK may be transmitted through a PUCCH as an uplink control channel.

Hereinafter, time, frequency, and code resources used for transmission of an ACK/NACK signal are referred to as ACK/NACK resources or PUCCH resources. As described above, an index for determining a PUCCH resource (referred to as a PUCCH index), that is, an index necessary to transmit an ACK/NACK signal on a PUCCH may be expressed as at least one of orthogonal sequence index i, cyclic shift index Ics, resource block index m, and indexes (n(1)PUCCH) for obtaining the three indexes. That is, a PUCCH resource may include at least one of an orthogonal sequence, a cyclic shift, a resource block, and combinations thereof, and an index representing the PUCCH resource may be referred to as a PUCCH index.

Meanwhile, when an ACK/NACK is transmitted through a PUCCH, a resource forming a PUCCH (PUCCH resource) may implicitly or explicitly be determined. For example, a PUCCH resource may be determined based on a resource occupied by a PDSCH as a response target of the ACK/

NACK or a control channel scheduled for data (transport block or codeword), and such a PUCCH resource is referred to as an implicit (or suggested) PUCCH resource. Meanwhile, one or a plurality of resources explicitly indicated by a higher-layer signal for use is referred to an explicit PUCCH resource.

Hereinafter, a general random access method will be described. Random access is used to allow the UE to acquire uplink synchronization with the base station or to be allocated with uplink radio resource. Random access may be divided into contention based random access and non-contention based random access.

Figure 12A:
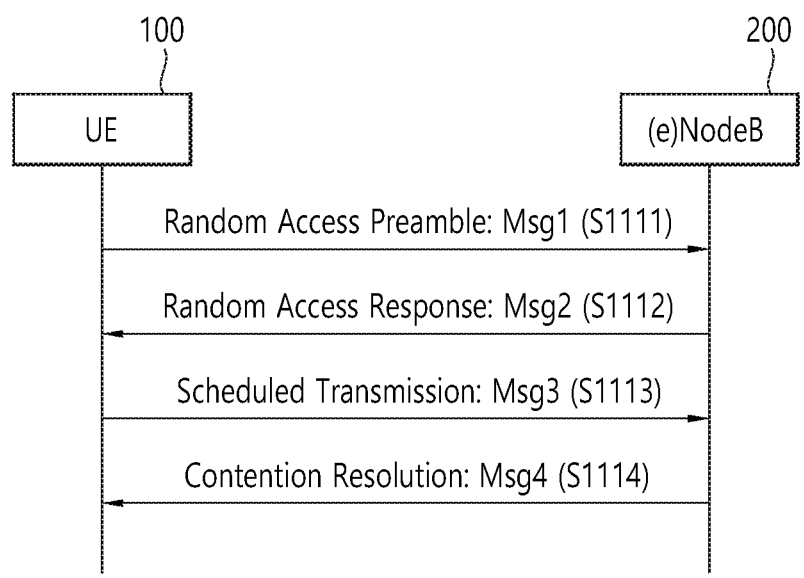
FIG. 12a illustrates drawing showing a contention based random access method.

FIG. 12a illustrates drawing showing a contention based random access method.

Referring to FIG. 12a, the UE 100 randomly selects one random access preamble from a set of random access preambles that are designated through the system information or handover command. And, by selecting a radio resource that can transmit the random access preamble, the UE 100 transmits the selected random access preamble (Message 1: Msg 1) (S1111). The radio resource may correspond to a specific subframe, and this may be a subframe that selects a PRACH (Physical Random Access Channel).

After transmitting the random access preamble, the UE 100 attempts to receive a Random Access Response (RAR) within a RAR receiving window (RAR window), which is designated through the system information or handover command, and, accordingly, the UE 100 receives a Random Access Response (RAR) (Message 2: Msg2) (S1112). The Random Access Response (RAR) may be transmitted in a MAC PDU (Protocol data unit) Format.

A Random Access Preamble identifier (ID), a UL Grant (uplink radio resource), a temporary C-RNTI (Temporary Cell-Radio Network Temporary Identifier), and a synchronization correction command (e.g., Timing Advance Command (TAC)) may be included in the Random Access Response (RAR). And, since random access response information for one or more UEs 100 may be included in one Random Access Response (RAR), a random access preamble identifier may be included in order to notify to which UE 100 the included UL Grant, temporary C-RNTI, and synchronization correction command (e.g., Timing Advance Command (TAC)) are valid. The random access preamble identifier may correspond to an identifier respective to the random access preamble received by the base station (eNodeB) 200. The synchronization correction command (e.g., Timing Advance Command (TAC)) may be included as information for allowing the UE 100 to adjust the uplink synchronization. The random access response may be directed by a random access identifier within the PDCCH, i.e., RA-RNTI (Random Access-Radio Network Temporary Identifier).

When the UE receives a Random Access Response (RAR) that is valid to the UE itself, the UE 100 processes the information included in the Random Access Response (RAR), and, then, the UE 100 performs a scheduled transmission (Message 3: Msg 3) to the base station (eNodeB) 200 (S1113). More specifically, the UE 100 applies a synchronization correction command (e.g., Timing Advance Command: TAC) and stores a temporary C-RNTI. Additionally, by using a UL Grant, the UE 100 transmits data stored in the buffer of the UE 100 or newly generated data to the base station (eNodeB) 200. In this case, information that can identify the UE 100 should be included. This is because, during a contention based random access procedure, since it is difficult for the base station (eNodeB) 200 to determine which UEs 100 perform random access, the corresponding UE 100 is required to be identified in order to resolve collision.

After the UE 100 transmits the scheduled message (i.e., MSG3) including its own identifier through a radio resource, which is allocated by the UL Grant being included in the random access response (RAR), the UE 100 waits for an indication (Message 4: Msg 4) from the base station (eNodeB) 200 in order to resolve collision (S1114). More specifically, the reception of PDCCH is attempted in order to receive a specific message.

Figure 12B:
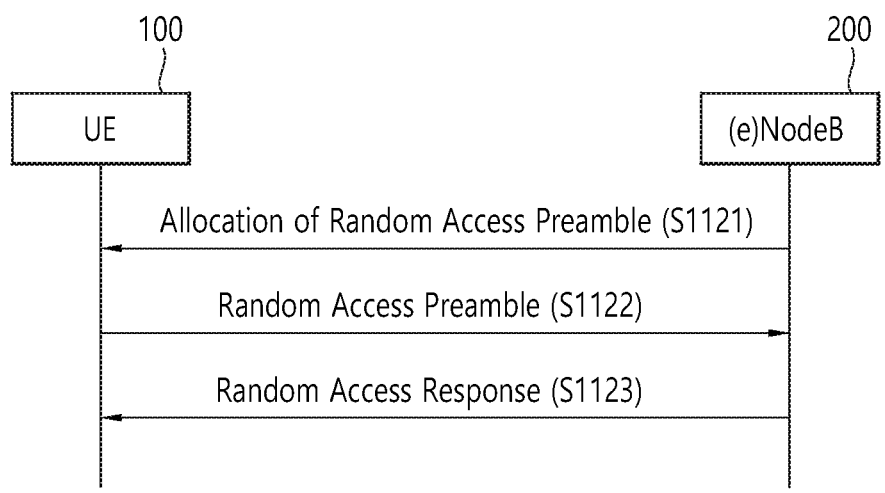
FIG. 12b illustrates drawing showing a non-contention based random access method.

FIG. 12b illustrates drawing showing a non-contention based random access method.

Unlike the contention based random access, the non-contention based random access may be ended by having the UE 100 receive the random access response.

The non-contention based random access may be initiated by a request, such as a handover and/or a command of the base station (eNodeB) 200. However, in the two cases that are described above, the contention based random access may also be performed.

The UE 100 is allocated with a designated random access preamble that has no likelihood of collision from the base station (eNodeB) 200. The allocation of the random access preamble may be performed through a handover command and a PDCCH command (S1121).

After the UE 100 is allocated with a random access preamble that is designated for the UE 100 itself, the UE 100 transmits the corresponding random access preamble to the base station (eNodeB) 200 (S1122).

When the base station (eNodeB) 200 receives the random access preamble, the base station (eNodeB) 200 transmits a Random Access Response (RAR) as a response to such reception (S1123).

Meanwhile, the MTC will hereinafter be described.

Figure 13A:
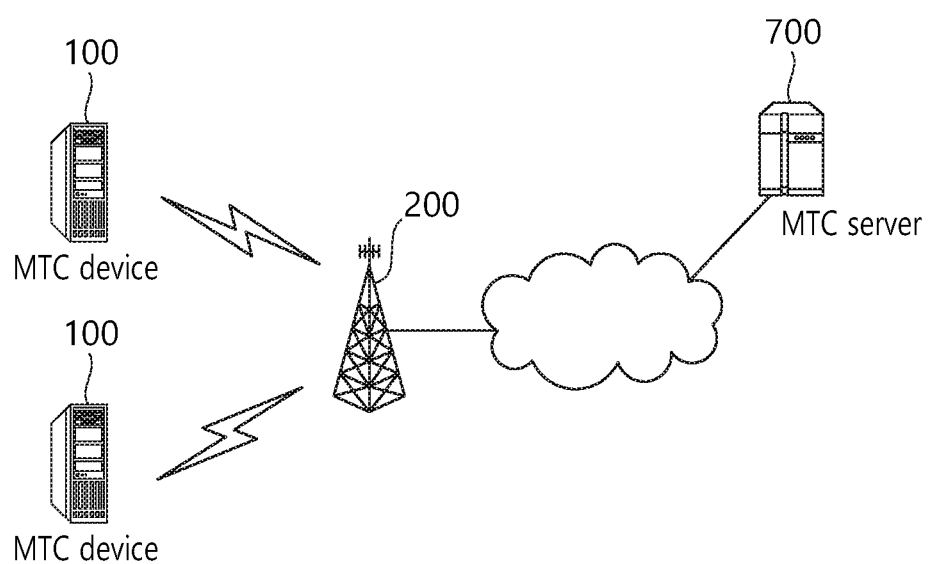
FIG. 13a illustrates an exemplary of MTC (Machine Type communication).

FIG. 13a illustrates an exemplary of MTC (Machine Type communication).

MTC (Machine Type Communication) refers to an information exchange between MTC device 100 that do not involve human interaction through the base station 200 or an information exchange between an MTC device 100 and an MTC server 700 through the base station.

The MTC service 700 refers to an entity that communicates with an MTC device 100. The MTC server 700 executes an MTC application and provides an MTC-specific service to the MTC device 100.

As a wireless device providing MTC, the MTC device 100 may be fixed or have mobility.

Services provided through MTC are differentiated from the existing communication services that involve human intervention, and an extended range of MTC services is provided, such as tracking, metering, payment, medical services, remote controlled services, and so on. More specifically, examples of MTC services may include reading meters, measuring water levels, using surveillance cameras, making inventory reports for vending machines, and so on.

One of the characteristics of the MTC device is that is has a small transmission data amount and that uplink/downlink data transmission/reception occurs occasionally. And, therefore, it will be effective to decrease a unit cost of the MTC device and to reduce battery consumption in accordance with the low data transmission rate. Another characteristic of the MTC device is that it has low mobility, and, accordingly, its channel environment hardly changes.

Figure 13B:
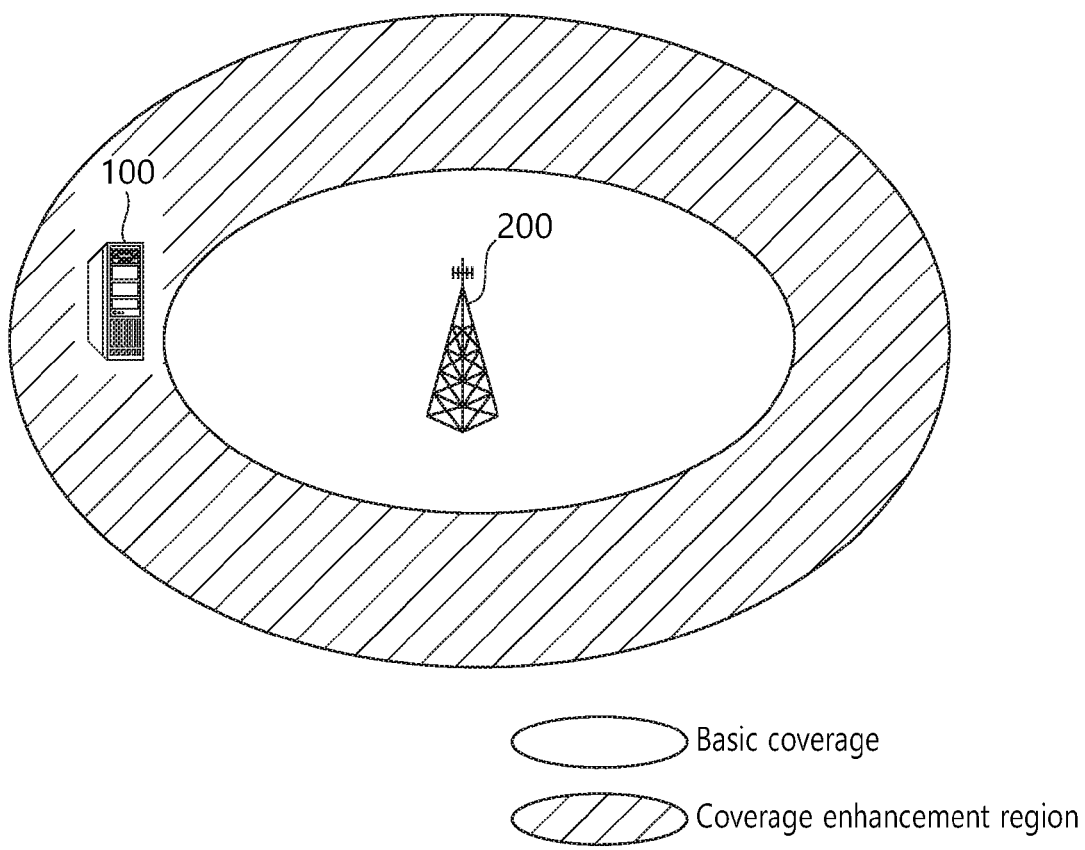
FIG. 13b illustrates an example of cell coverage enhancement for MTC devices.

FIG. 13b illustrates an example of cell coverage enhancement for MTC devices.

Recently, enhancing the cell coverage of the base station for MTC device 100 has been considered, and diverse methods for cell coverage enhancement are being discussed.

However, in case the coverage of a cell is enhanced, if the base station transmits PDSCH and (E)PDCCH including scheduling information respective to the PDSCH to an MTC device that is located in the coverage enhancement region, just as when the base station performs transmission to general UEs, the MTC device may have difficulty in receiving the channels.

Herein, (E)PDCCH signifies a PDCCH or EPDCCH (E-PDCCH).

More specifically, in case of a MTC device (or MTC user equipment), since the transmission size is small, and since uplink/downlink data transmission/reception occurs occasionally, it will be efficient to lower the price of the user equipment and to reduce battery consumption in accordance with such low data transmission rate.

One of the characteristics of such MTC device is that it has low mobility, and, accordingly, another one of its characteristics is that its channel environment does not change. In the current LTE-A, it is being considered to provide such MTC devices with wider coverage as compared to the legacy MTC device, and, in order to do so, extensive discussions are being carried out on diverse coverage enhancement methods for MTC devices.

In case the user equipment (UE) performs initial access to a specific cell, the UE receives MID (master information block) and SIB (system information block) information and RRC (radio resource control) parameters respective to the corresponding cell from the base station (eNodeB), which manages/controls the corresponding cell.

At this point, there lies a problem in that the MTC device should have a wider coverage as compared to the legacy UE. Therefore, if the base station (eNodeB) transmits a SIB just as when transmitting it to the legacy UE, the MTC device may have difficulty in receiving the transmitted SIB. In order to resolve this, in case the base station (eNodeB) transmits a SIB of a MTC device having a coverage issue through the PDSCH, the base station (eNodeB) may perform transmission by applying methods for coverage enhancement, such as subframe repetition, subframe bundling, and so on.

Additionally, in case the base station (eNodeB) transmits the PDCCH and PDSCH to the MTC devices, when the base station performs transmission by using the same transmission method as when performing transmission to the legacy UE, a MTC device having coverage issues may have difficulty in receiving the PDCCH and PDSCH. In order to resolve this problem, in case the base station (eNodeB) transmits the PDCCH or PDSCH to a MTC device having coverage issues, the base station (eNodeB) may perform transmission by applying methods for coverage enhancement, such as subframe repetition, subframe bundling, and so on. Similarly, even in case the UE (or MTC device) transmits the PUCCH and PUSCH to the base station, in order to enhance the coverage, the UE (or MTC device) may use a method of performing repetitive (or repeated) transmission through multiple frames.

In case a MTC device having coverage issues and a legacy UE or a MTC device that does not have any coverage issues are serviced by the same cell, there lies a problem in that a large amount of resource is used in order to transmit data to the MTC device having coverage issues, thereby causing limitations in services that are to be provided to other user equipments. Accordingly, in order to prevent the MTC device having coverage issues from causing any damage (or harm) to other UEs, a TDM (Time division multiplexing) method may be used, wherein the time domain for providing services is divided for the UE having coverage issues and the UE that does not have any coverage issue. The TDM method may be carried out at long-term intervals consisting of units of several tens of minutes, and the TDM method may also be carried out at short-term intervals consisting of subframe units.

<Disclosures of the Present Invention>

Thus, disclosures of the present specification are provided to solve the foregoing problem.

According to the disclosures of the present specification, to solve the foregoing problem, when a BS transmits a PDSCH, a PDCCH, or an EPDCCH to an MTC device 100 located in a coverage extension region, the BS repeatedly transmits the PDSCH, the PDCCH, or the EPDCCH on a plurality of subframes (for example, a bundle of subframes).

Further, according to the disclosures of the present specification, when the MTC device located in the coverage extension region transmits a PUCCH or PUSCH, the MTC device 100 repeatedly transmits the PUCCH or PUSCH on a plurality of subframes (for example, a bundle of subframes).

For example, the MTC device receives a bundle of (E)PDCCHs through a plurality of subframes and decodes the bundle of (E)PDCCHs, thereby decoding success rate.

That is, the MTC device may successfully decode a (E)PDCCH by using all or part of (E)PDCCHs in a bundle received through a plurality of subframes. That is, the MTC device may decode a (E)PDCCH bundle in which the same (E)PDCCH is repeated, thereby improving decoding success rate.

Likewise, the MTC device receives a bundle of PDSCHs through a plurality of subframes and decodes all or part of the PDSCHs in the bundle, thereby decoding success rate. Similarly, the MTC device located in the coverage extension region may transmit a bundle of PUCCHs through a plurality of subframes. Also, the MTC device may transmit a bundle of PUSCHs through a plurality of subframes.

Here, a PDSCH, PDCCH, EPDCCH, PUCCH, or PUSCH bundle may be used to indicate that a PDSCH, PDCCH, EPDCCH, PUCCH, or PUSCH is repeatedly transmitted over a predetermined number of subframes according to a repetition level.

The repetition level may refer to repetition number as the number of subframes for repeated transmissions (subframe numbers for repetition) or may be a value (for example, a proportional value) determined corresponding to the number of repetitions.

Figure 14A:
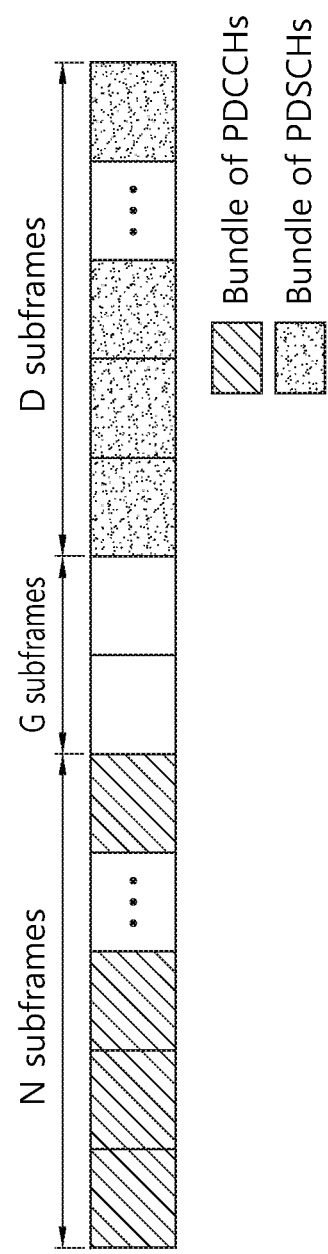
FIG. 14a and FIG. 14b illustrate exemplary diagrams respectively showing examples of a bundle of (E)PDCCHs and a bundle of PDSCHs being transmitted.
Figure 14B:
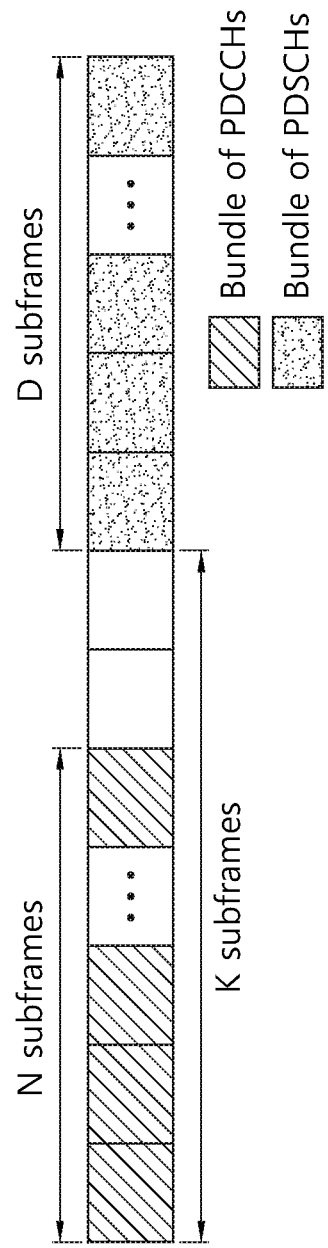

FIG. 14a and FIG. 14b illustrate an example of transmission of a (E)PDCCH bundle and a PDSCH bundle.

Referring to FIG. 14a, a BS may transmit a (E)PDCCH bundle in which the same (E)PDCCH is repeated on a plurality of subframes (for example, N subframes) to an MTC device located in a coverage extension region. Further, the BS may transmit a PDSCH bundle in which the same PDSCH is repeated on a plurality of subframes (for example, D subframes). Here, the PDSCH bundle may be transmitted after a predetermined gap, for example, a gap of G subframes, after the PDCCH bundle is completely transmitted.

For example, when transmission of the PDCCH bundle is finished on subframe N−1, the PDSCH bundle may be transmitted on D subframes, starting from subframe N+G. Here, N and D may always be set to the same value. Also, G and D may have the same value. G may be known in advance to a UE or be transmitted to the UE via system information, for example, an MIB or SIB.

D may be set or designated differently depending on a coverage extension degree. Alternatively, D may be designated differently depending on an aggregation level of each (E)PDCCH. For example, G may be set considering that a (E)PDCCH is repeated in different numbers by aggregation levels.

Meanwhile, the MTC device may know that transmission of the PDSCH bundle is started after G subframes after receiving the (E)PDCCH bundle.

Referring to FIG. 14b, the BS may transmit, for the MTC device located in the coverage extension region, a (E)PDCCH bundle in N subframes and then transmit a PDSCH bundle in D subframes after a certain period of time.

Alternatively, the BS may transmit, for the MTC device located in the coverage extension region, a (E)PDCCH bundle in N subframes and then transmit a PDSCH bundle in D subframes after K subframes from a subframe in which transmission of the PDCCH bundle is started.

That is, a difference between a location of a subframe in which transmission of the (E)PDCCH bundle is started and a location of a subframe in which transmission of the PDSCH bundle is started is defined as K subframes (for example, K=100 or 200).

In this case, the MTC device needs to know in which subframe transmission of the (E)PDCCH bundle is started.

For example, defining that K=index of PDSCH bundle transmission start subframe-index of (E)PDCCH bundle transmission start subframe, the MTC device may need to know a timing at which transmission of the PDCCH bundle is started in order to successfully know a timing at which transmission of the PDSCH bundle is started.

In this case, the MTC device may know a location of a subframe at which transmission of the PDSCH bundle is started even though not being aware of the number of subframes for transmitting the (E)PDCCH bundle.

It may be assumed that K is always fixed. Alternatively, K may be known to the MTC device or be transmitted via an MIB or SIB. K may be set differently depending on a coverage extension degree. K may be set differently depending on an aggregation level of each (E)PDCCH. For example, K may be set considering considering that a (E)PDCCH is repeated in different numbers by aggregation levels.

As described above, a subframe location for starting transmission of the (E)PDCCH bundle is not random unlike in a conventional art, and transmission of the (E)PDCCH bundle may be started in a predetermined subframe. A subframe location at which transmission of the (E)PDCCH bundle is started may be defined as a fixed value. The fixed value may be notified to the MTC device through system information, for example, an MIB or SIB. For example, assuming that transmission of the (E)PDCCH bundle is started only in SFN % N=0 (for example, N=20), N may be notified to the MTC device through an MIB. Also, assuming that transmission of the (E)PDCCH bundle is started only in an offset (SFN % N=offset), N may be notified to the MTC device through an MIB. For example, transmission of the (E)PDCCH bundle for the MTC device located in the coverage extension region may be started only in a subframe or SFN corresponding to a multiple of 100 (subframe 0, 100, 200, 300, . . . ).

Here, the MTC device may attempt to receive the (E)PDCCH through N subframes starting from a subframe or SFN corresponding to a multiple of 100.

The subframe location at which transmission of the PDCCH bundle is started may change depending on an MTC device. That is, the subframe location at which transmission of the (E)PDCCH bundle is started may be determined to be user-specific.

In this case, information on the subframe location at which transmission of the PDCCH bundle is started may be notified to the MTC device through a higher-layer signal, such as an RRC signal.

Subframes for transmitting a PDCCH/EPDCCH/PDSCH/PUCCH/PUSCH may be consecutive or non-consecutive.

However, it may be assumed that a terminal may recognize which subframes a bundle is transmitted through. Further, the number of subframes for transmitting a PDCCH/EPDCCH/PDSCH/PUCCH/PUSCH, repetition number, or a repetition level may be set to vary depending on a coverage enhancement level required by the terminal, be set in advance, be transmitted via an SIB, or be estimate by a UE.

The MTC device may not always use all subframes to transmit and receive a control channel and a data channel. If necessary, subframes designated as an MBSFN subframe or special subframe may be unavailable for repetition/bundling of control channels and data channels, and only some subframes may be used for repetition/bundling of control channels and data channels for the MTC device in order to reduce effect on an operation of a legacy UE.

Here, a location of a subframe used by the MTC device for repetition/bundling of control channels and/or data channels in downlink and/or uplink environments may be defined in advance or be semi-statically set.

In this case, the MTC device may recognize, through a SIB or RRC signaling, the location of the subframe used for repetition/bundling of control channels and/or data channels in the downlink and/or uplink environments.

Hereinafter, the term of a total aggregate resource (TAR) for an (E)PDCCH used in the disclosures of the present specification is described.

Figure 15:
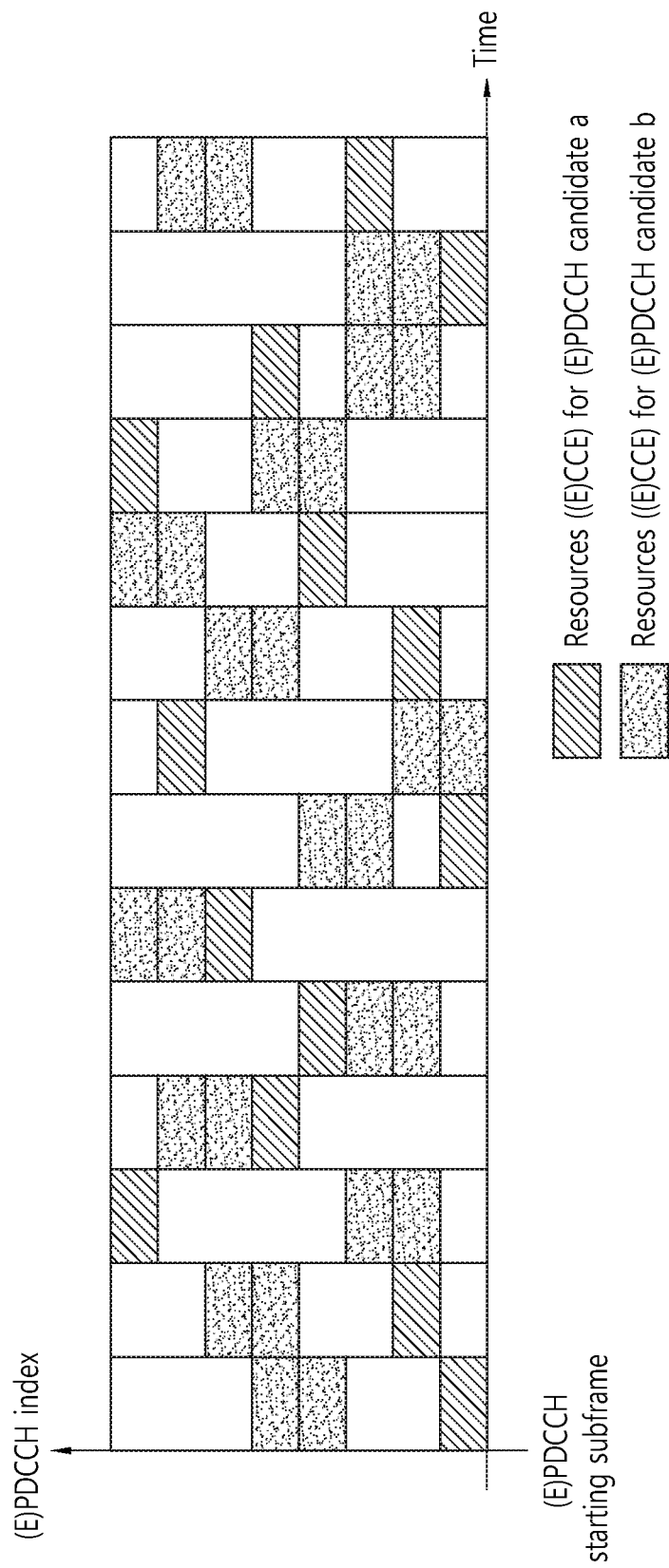
FIG. 15 illustrates an example of a TAR for an (E)PDCCH according to one disclosure of the present specification.

FIG. 15 illustrates an example of a TAR for an (E)PDCCH according to one disclosure of the present specification.

A TAR for an (E)PDCCH may be defined for a decoding candidate channel such that the TAR is given by Sum (ai) where i=0, . . . , T−1, where T is repetition number and ai is the amount or number of resources in subframe i.

For example, the resource may denote an (E)CCE.

Further, the repetition number may denote the number of subframes repeatedly transmitted according to a repetition level. For example, when the repetition number is equal to a repetition level, if the repetition level is 4, the repetition number may be 4. Further, when repetition number corresponding to a repetition level is designated in advance, repetition number corresponding repetition level 1 may be 2 and repetition number corresponding to repetition level 2 may be 4.

Thus, a TAR value may be regarded as being determined based on a repetition level and the amount or number of resources per subframe corresponding to the candidate channel.

Specifically, a UE may monitor two or more (E)PDCCH decoding candidates in order to receive an (E)PDCCH repeatedly transmitted through multiple subframes starting from a specific subframe.

Here, the (E)PDCCH decoding candidates may have the same TAR value or different TAR values. That is, the UE may monitor at least one TAR for the (E)PDCCH decoding candidates at a time in order to receive the (E)PDCCH repeatedly transmitted through the multiple subframes from the specific subframe.

For example, as illustrated in FIG. 15, the UE may monitor two (E)PDCCH candidates, which are (E)PDCCH candidate a and (E)PDCCH candidate b.

Here, the locations and number of (E)CCEs in each subframe for transmitting each (E)PDCCH candidate and the number of subframes for transmitting each (E)PDCCH may be the same or different depending on each (E)PDCCH.

Here, the locations of some (E)CCEs available for transmission of the respective (E)PDCCHs may overlap. In FIG. 15, (E)PDCCH candidate a may be transmitted through 14 subframes and be transmitted through one (E)CCE in each subframe.

(E)PDCCH candidate b may be transmitted through 14 subframes and be transmitted through two (E)CCEs in each subframe. In this case, (E)PDCCH candidate b may have two times greater TARs than (E)PDCCH candidate a.

Meanwhile, the following disclosures of the present specification provide approaches for determining, allocating, or setting PUCCH transmission resources when a PUCCH is repeatedly transmitted through multiple subframes for an MTC device located in a coverage extension region.

Specifically, a first disclosure of the present specification provides approaches for determining or setting explicit PUCCH resources used for repeated transmission of a PUCCH, while a second disclosure of the present specification provides approaches for determining or setting implicit PUCCH resources used for repeated transmission of a PUCCH.

<First Disclosure of Present Specification—Methods for Determining Explicit PUCCH Resources>

As described above, the first disclosure of the present specification provides approaches for determining or setting explicit PUCCH resources used for repeated transmission of a PUCCH.

That is, the first disclosure of the present specification provides approaches for determining, setting, or allocating a resource region for transmitting a PUCCH in a subframe when the PUCCH is repeatedly transmitted through multiple subframes for an MTC device located in a coverage extension region.

Specifically, a method according to the first disclosure of the present specification is a method for a terminal to transmit a PUCCH, which may include: receiving a plurality of pieces of explicit configuration information on a PUCCH resource through higher-layer signaling when a PUCCH needs to be repeatedly transmitted on a plurality of subframes; determining a PUCCH resource for transmitting the PUCCH based on the plurality of pieces of explicit configuration information; and repeatedly transmitting the PUCCH via the determined PUCCH resource on the plurality of subframes.

Here, the PUCCH resource for transmitting the PUCCH may be determined based on at least one of a PDCCH, an EPDCCH, and an identification (ID) of the terminal, which are previously received.

Further, the previously received PDSCH may be scheduled by the previously received PDCCH or EPDCCH, and the PUCCH may include ACK/NACK information in response to the previously received PDSCH.

Further, the previously received PDCCH or EPDCCH may be repeatedly transmitted on a plurality of downlink subframes according to a repetition level, the previously received PDCCH may be received by monitoring a plurality of PDCCH candidates, and the previously received EPDCCH may be received by monitoring a plurality of EPDCCH candidates.

Further, the PUCCH resource for transmitting the PUCCH may be determined based on a total aggregate resource (TAR) value for a PDCCH candidate from which the previously received PDCCH is retrieved among the plurality of PDCCH candidates, and the TAR value for the PDCCH candidate may be determined based on a repetition level and the number of resources per subframe for the previously received PDCCH.

Further, the PUCCH resource for transmitting the PUCCH may be determined based on the maximum TAR value for the plurality of PDCCH candidates, the maximum TAR value may be a TAR value having the maximum value among respective TAR values for the plurality of PDCCH candidates, and the respective TAR values for the plurality of PDCCH candidates may be determined based on repetition levels and numbers of resources per subframe respectively for the plurality of PDCCH candidates.

Further, the ID of the terminal may be a cell radio network temporary identifier (C-RNTI).

Further, the PUCCH resource for transmitting the PUCCH may be determined based on a location of a first control channel element (CCE) of the previously received PDCCH or a first enhanced CCE (ECCE) of the previously received EPDCCH.

Further, the PUCCH resource for transmitting the PUCCH may be randomly determined based on a predetermined random sequence whenever a PUCCH transmission event occurs.

Further, the PUCCH resource for transmitting the PUCCH may be maintained the same while the PUCCH is repeatedly transmitted on the plurality of subframes.

Further, the random sequence may be determined based on a subframe index or system frame number (SFN).

Further, the random sequence may be a random sequence initialized based on at least one of the PDCCH, EPDCCH, and ID of the terminal, which are previously received.

Meanwhile, a method of transmitting an ACK/NACK of a PDSCH received from an eNodeB when one serving cell is configured for a UE is illustrated as follows.

HARQ-ACK transmission on two antenna ports ($p \in [p_0, p_1]$) is supported for PUCCH format 1a/1b.

For FDD and one configured serving cell, the UE may use PUCCH resource $n_{PUCCH}^{(1,\tilde{p})}$ for transmission of HARQ-ACK in subframe n for $\tilde{p}$ mapped to antenna port p for PUCCH format 1a/1b [3].

For PDSCH transmission indicated by the detection of a corresponding PDCCH in subframe n−4, or for a PDCCH indicating downlink semi-persistent scheduling (SPS) release in) subframe n−4, the UE may use $n_{PUCCH}^{(1,\tilde{p}0)} = n_{CCE} + N_{PUCCH}^{(1)}$ for antenna port p0, where $n_{CCE}$ is the index of a first CCE (i.e. lowest CCE index used to construct the PDCCH) used for transmission of the corresponding DCI (that is, assignment of a downlink resource for reception of downlink data as a target of an ACK/NACK signal) and $N_{PUCCH}^{(1)}$ is a parameter notified by the eNodeB to via a higher-layer message. For two antenna port transmission, a PUCCH resource for antenna port p1 is given by $n_{PUCCH}^{(1,\tilde{p}1)} = n_{CCE} + 1 + N_{PUCCH}^{(1)}$.

For PDSCH transmission on the primary cell where there is not a corresponding PDCCH/EPDCCH detected in subframe n−4, the value of $n_{PUCCH}^{(1,\tilde{p})}$ is determined according to higher-layer configuration. For a UE configured for two antenna port transmission, a PUCCH resource value maps to two PUCCH resources, which are a first PUCCH resource $n_{PUCCH}^{(1,\tilde{p}0)}$ for antenna port p0 and a second PUCCH resource $n_{PUCCH}^{(1,\tilde{p}1)}$ for antenna port p1. Otherwise, the PUCCH resource value maps to a single PUCCH resource $n_{PUCCH}^{(1,\tilde{p}_0)}$ for antenna port p0.

If EPDCCH-PRB-set q is configured for distributed transmission, a PUCCH index (or PUCCH resource) is determined according to the following equation.

$$n_{PUCCH}^{(1,\tilde{p}_0)} = n_{ECCE,q} + \sum_{i1=0}^{m-1} N_{ECCE,q,n-k_{i1}} + \Delta_{ARO} + N_{PUCCH,q}^{(e1)} \quad \text{[Equation 4]}$$

If EPDCCH-PRB-set q is configured for localised transmission, a PUCCH index (or PUCCH resource) is determined according to the following equation.

$$n_{PUCCH}^{(1,\tilde{p}_0)} = \left\lfloor \frac{n_{ECCE,q}}{N_{RB}^{ECCE,q}} \right\rfloor \cdot N_{RB}^{ECCE,q} + \quad \text{[Equation 5]}$$
$$\sum_{i1=0}^{m-1} N_{ECCE,q,n-k_{i1}} + n' + \Delta_{ARO} + N_{PUCCH,q}^{(e1)}$$

In the foregoing equation, $N_{ECCE,q}$ denotes the number of a first ECCE used for transmission of corresponding DCI assignment in subframe $n-k_m$ and EPDCCH-PRB-set q of corresponding m, for antenna port $p_0$. $N^{(e1)}_{PUCCH,q}$ is configured by a higher layer. $N_{ECCE,q,n-k_{i1}}$ denotes the number of ECCEs in EPDCCH-PRB-set q configured in subframe $n-k_{i1}$. $\Delta_{ARO}$ is a value determined from an HARQ-ACK resource offset field included in the DCI format of a corresponding EPDCCH.

For two antenna transmission, a PUCCH resource for antenna port p1 is given for distributed transmission as follows.

$$n_{PUCCH}^{(1,\tilde{p}_1)} = n_{ECCE,q} + 1 + \Delta_{ARO} + N_{PUCCH,q}^{(e1)} \quad \text{[Equation 6]}$$

Further, for two antenna transmission, a PUCCH resource for antenna port p1 is given for localized transmission as follows.

$$n_{PUCCH}^{(1,\tilde{p}_1)} = \left\lfloor \frac{n_{ECCE,q}}{N_{RB}^{ECCE,q}} \right\rfloor \cdot N_{RB}^{ECCE,q} + 1 + n' + \Delta_{ARO} + N_{PUCCH,q}^{(e1)} \quad \text{[Equation 7]}$$

$\Delta_{ARO}$ values according to an ACK/NACK resource offset field in DCI formats 1A/1B/1D/1/2A/2/2B/2C/2D are illustrated in the following table.

TABLE 6

| ACK/NACK resource offset field in DCI formats 1A/1B/1D/1/2A/2/2B/2C/2D | $\Delta_{ARO}$ |
|---|---|
| 0 | 0 |
| 1 | −1 |
| 2 | −2 |
| 3 | 2 |

Here, the location of a PUCCH transmission resource for transmitting ACK/NACK information in response to a PDSCH of an MTC device that needs coverage enhancement may be determined according to the first (E)CCE (first CCE or ECCE: lowest (E)CCE index used to construct the (E)PDCCH) of an (E)PDCCH scheduling the PDSCH as in the conventional method.

Figure 16:
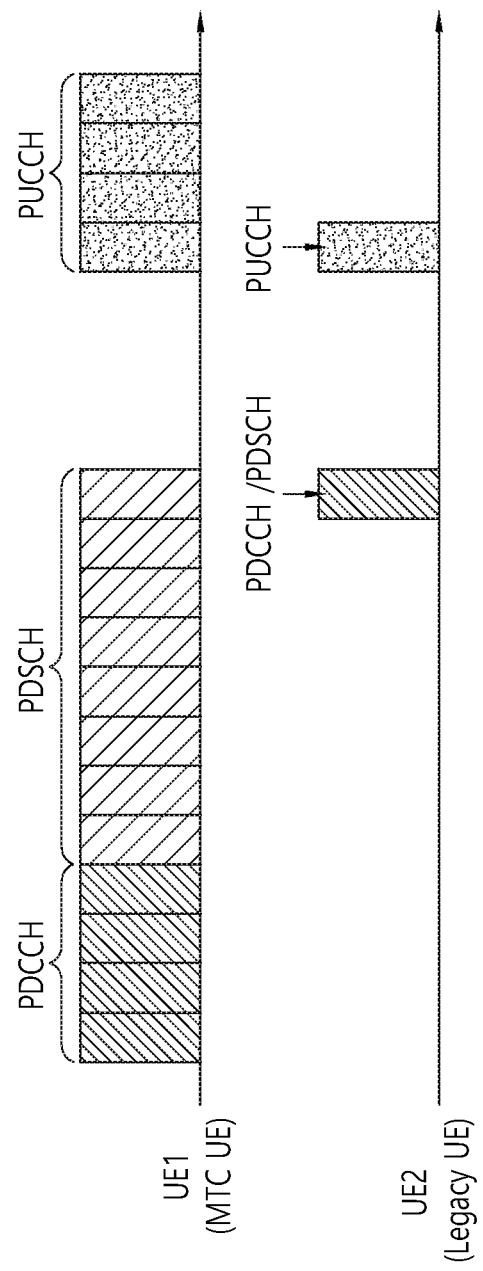
FIG. 16 illustrates a problem that two PUCCH resources overlap when a (E)PDCCH for an MTC device and a (E)PDCCH for a legacy UE have the same first (E)CCE.

FIG. 16 illustrates a problem that two PUCCH resources overlap when a (E)PDCCH for an MTC device and a (E)PDCCH for a legacy UE have the same first (E)CCE.

Referring to FIG. 16, even when (E)PDCCHs for the MTC device located in the coverage extension region and the legacy UE or terminal are transmitted through different subframes, PUCCHs may be transmitted through the same subframe.

Here, when the (E)PDCCH for the MTC device and the (E)PDCCH for the legacy UE have the same first (E)CCE, transmission resources for the two PUCCHs may overlap.

To prevent such a problem, the PUCCH of the MTC device that needs coverage enhancement may be transmitted using an explicit PUCCH resource.

The explicit PUCCH resource may be assigned by a higher layer and be user-specific. Further, a plurality of explicit PUCCH resources may be assigned for one terminal in order to select an appropriate PUCCH resource index according to an interference condition or channel environment.

Influential Factors in Determining Explicit PUCCH Resource

Meanwhile, when a plurality of explicit PUCCH resources is assigned for one UE, the UE actually needs to determine a PUCCH resource to use for PUCCH transmission.

To this end, the UE may receive a plurality of pieces of explicit configuration information on the PUCCH resources through higher-layer signaling in order to determine or set the PUCCH resource (or explicit PUCCH resource).

In determining the index of a PUCCH resource, multiplexing with other UEs assigned the same resource as an explicit PUCCH resource may also be considered. The following factors may be considered in determining the index of an explicit resource for transmitting a PUCCH.

(a) TAR Value of (E)PDCCH Received by UE

The explicit resource for the PUCCH (or explicit PUCCH resource) may be determined, set, or assigned based on the TAR value of the (E)PDCCH.

Here, the (E)PDCCH may be an (E)PDCCH scheduling a PDSCH when the UE transmits a PUCCH including ACK/NACK (A/N) information in response to the PDSCH.

That is, the PDSCH may be a previously received PDSCH, the previously received PDSCH may be scheduled by a previously received PDCCH or EPDCCH, and the PUCCH may include ACK/NACK information in response to the previously received PDSCH.

Further, the (E)PDCCH may be an (E)PDCCH received most recently (or successfully decoded) by the UE before transmitting the PUCCH. Alternatively, the (E)PDCCH may be an (E)PDCCH received most recently (or successfully decoded) by the UE via a subframe which is n subframes (for example, n=4) before a subframe for transmitting the PUCCH.

Specifically, the previously received PDCCH or EPDCCH is repeatedly transmitted on a plurality of downlink subframes according to a repetition level, the previously received PDCCH may be received by monitoring a plurality of PDCCH candidates, and the previously received EPDCCH may be received by monitoring a plurality of EPDCCH candidates.

Here, the PUCCH resource for transmitting the PUCCH may be determined based on a TAR value of a PDCCH candidate from which the previously received PDCCH is retrieved among the plurality of PDCCH candidates, and the TAR value of the PDCCH candidate may be determined based on a repetition level and the number of resources per subframe for the previously received PDCCH.

(b) Maximum TAR Value for (E)PDCCH Candidates Monitored by UE

The index of the explicit resource for the PUCCH may be determined according to the maximum TAR value among TARs for the (E)PDCCH candidates monitored by the UE.

Specifically, the PUCCH resource for transmitting the PUCCH may be determined based on the maximum TAR value for the plurality of PDCCH candidates, the maximum TAR value may be a TAR value having the maximum value among the respective TAR values for the plurality of PDCCH candidates, and the respective TAR values for the plurality of PDCCH candidates may be determined based on repetition levels and numbers of resources per subframe respectively for the plurality of PDCCH candidates.

(c) ID of UE Transmitting PUCCH

For the randomization of the PUCCH resource, the index of the explicit PUCCH resource may be implicitly determined according to the ID (for example, C-RNTI) of the UE that transmits the PUCCH.

(d) First (E)CCE for (E)PDCCH Received by UE

When the UE transmits the PUCCH including the A/N information in response to the PDSCH, the index of the explicit PUCCH resource may be implicitly determined according to the index of the first (E)CCE for transmitting the (E)PDCCH scheduling the PDSCH (lowest (E)CCE index used to construct the (E)PDCCH).

That is, the PUCCH resource for transmitting the PUCCH may be determined based on the index of a first CCE of the previously received PDCCH or a first ECCE of the previously received ECCE.

(e) Index of (E)PDCCH Candidate Received by UE

The index of the explicit PUCCH resource may be determined according to the index of the (E)PDCCH received by the UE, which may be useful particularly when resources to construct one (E)PDCCH candidate may be set as resources in multiple subframes.

Hereinafter, methods for determining an explicit PUCCH resource index will be illustrated.

Determination Method 1-1

In order to determine the index of an explicit resource for transmitting a PUCCH considering the foregoing factors (a) to (e), an explicit PUCCH resource for a UE may be determined according to (a), (b), (c), (d), and/or (e). Here, the foregoing factors may be used in combinations with other factors to determine the index of the explicit PUCCH resource for the UE. Here, the index of the explicit PUCCH resource may be determined according to the value of each factor by a table or equation. The table or equation may be defined in the specification or set for the UE through an SIB or RRC signal. For example, when the explicit PUCCH resource to be used by the UE is determined according to the TAR value of a (E)PDCCH received by the UE as in (a), the explicit PUCCH resource according to the TAR value of the (E)PDCCH may be determined as listed in Table 1.

TABLE 7

| TAR of (E)PDCCH | Index of explicit PUCCH resource |
|---|---|
| 10 | 0 |
| 20 | 1 |
| 40 | 2 |

In another example, when the index of the explicit PUCCH resource is determined according to the ID of the UE as in (c), defining the number of explicit PUCCH resources as N, the index of the explicit PUCCH resource to be used by the UE may be determined by UE_ID mod N.

In this case, particularly, when the PUCCH is repeatedly transmitted through multiple subframes, the index of the explicit PUCCH resource for transmitting the PUCCH may be maintained the same during the repetition. In particular, the same index of the explicit PUCCH resource as used in a first subframe in which the PUCCH is transmitted may be used for the repetition.

Determination Method 1-2

The index of an explicit resource for transmitting a PUCCH may change randomly (according to a determined random sequence) whenever a UE transmits a PUCCH bundle. According to this method, a PUCCH transmission resource may be maintained the same while the PUCCH is repeatedly transmitted (during a repetition period). However, a PUCCH transmission resource may change whenever a PUCCH bundle is transmitted. For example, the PUCCH transmission resource may change (be determined) according to a repetition level for PUCCH transmission (or repetition number or the number of subframes). That is, the index of a PUCCH transmission resource for the UE to repeatedly transmit PUCCH1 through N1 subframes may be different from the index of a PUCCH transmission resource for the UE to repeatedly transmit PUCCH2 through N2 subframes. However, the same PUCCH transmission resource may be used in the N1 subframes for transmitting PUCCH1, and the PUCCH transmission resource may be used in the N2 subframes for transmitting PUCCH2. Particularly, the index of a resource for transmitting a PUCCH in a PUCCH bundle may be the same as a PUCCH resource used in a first subframe for the PUCCH bundle.

When a PUCCH is transmitted through multiple subframes, the index of an explicit PUCCH resource in a first subframe for transmitting the PUCCH may change depending on a subframe index (or SFN) of the first subframe for transmitting the PUCCH. For example, defining a random sequence as c(n), when the index of the first subframe for transmitting the PUCCH is k, the index of the explicit PUCCH resource in the first subframe for transmitting the PUCCH may be c(k). Alternatively, the index of the explicit PUCCH resource in the first subframe for transmitting the PUCCH may change according to an SFN to which the first subframe for transmitting the PUCCH belongs. For example, defining a random sequence as c(n), when the first subframe for transmitting the PUCCH belongs to SFN m, the index of the explicit PUCCH resource in the first subframe for transmitting the PUCCH may be c(m).

Here, the index of the explicit PUCCH resource for transmitting the PUCCH may also change according to the foregoing factors (a) to (e). That is, the index of the explicit PUCCH resource in the first subframe for transmitting the PUCCH may change according to a specific random sequence, and a value resulting from the random sequence may change according to the factors (a), (b), (c), (d), and/or (e). For example, a random sequence c(n) that determines the index of the explicit PUCCH resource may be a random sequence initialized by the factors (a), (b), (c), (d), and/or (e). For example, the random sequence may change according to the subframe index of the first subframe for transmitting the PUCCH and may be initialized based on the ID of the UE ($C_{init}$ may be determined according to the ID of the UE).

Determination Method 1-3 Subframe

The index of an explicit resource for transmitting a PUCCH may change randomly (according to a determined random sequence) whenever a UE transmits the PUCCH. According to this method, a PUCCH transmission resource may change by each subframe or multiple subframes even while the PUCCH is repeatedly transmitted. The index of an explicit PUCCH resource in a specific subframe may change according to the index of the subframe.

That is, even though the same PUCCH is repeatedly transmitted, if the index of a subframe for transmitting the PUCCH changes, the PUCCH may be transmitted through different explicit PUCCH resources. For example, defining a random sequence as c(n), the index of an explicit PUCCH resource in a subframe with index k may be c(k). Alternatively, the index of an explicit PUCCH resource in a specific subframe may change according to an SFN for transmitting the PUCCH. For example, defining a random sequence as c(n) and defining an SFN of subframe k as m_k, the index of the explicit PUCCH resource in subframe with index k may be c(m_k).

Here, the index of the explicit PUCCH resource for transmitting the PUCCH may also change according to the foregoing factors (a) to (e). That is, the index of the explicit PUCCH resource in the subframe for transmitting the PUCCH may change according to a specific random sequence, and a value resulting from the random sequence may change according to the factors (a), (b), (c), (d), and/or (e). For example, a random sequence c(n) that determines the index of the explicit PUCCH resource may be a random sequence initialized by the factors (a), (b), (c), (d), and/or (e). For example, the random sequence may change according to the index of the subframe for transmitting the PUCCH and may be initialized based on the ID of the UE ($C_{init}$ may be determined according to the ID of the UE).

Further, the index of the explicit PUCCH resource may change (be determined) according to a repetition level or repetition number.

<Second Disclosure of Present Specification—Methods for Determining Implicit PUCCH Resources>

As described above, the second disclosure of the present specification provides approaches for determining or setting implicit PUCCH resources used for repeated transmission of a PUCCH.

The foregoing description has been made on a method for an MTC device needing coverage enhancement to transmit a PUCCH using an explicit resource. However, a method for the MTC UE to transmit a PUCCH using an implicit PUCCH resource may still be considered.

Even when the MTC UE needing coverage enhancement transmits a PUCCH using an implicit PUCCH resource, the foregoing methods for setting a PUCCH transmission resource illustrated in the first disclosure of the present specification may also be applied. The PUCCH transmission resource may change by each subframe while the PUCCH is repeatedly transmitted.

Figure 17:
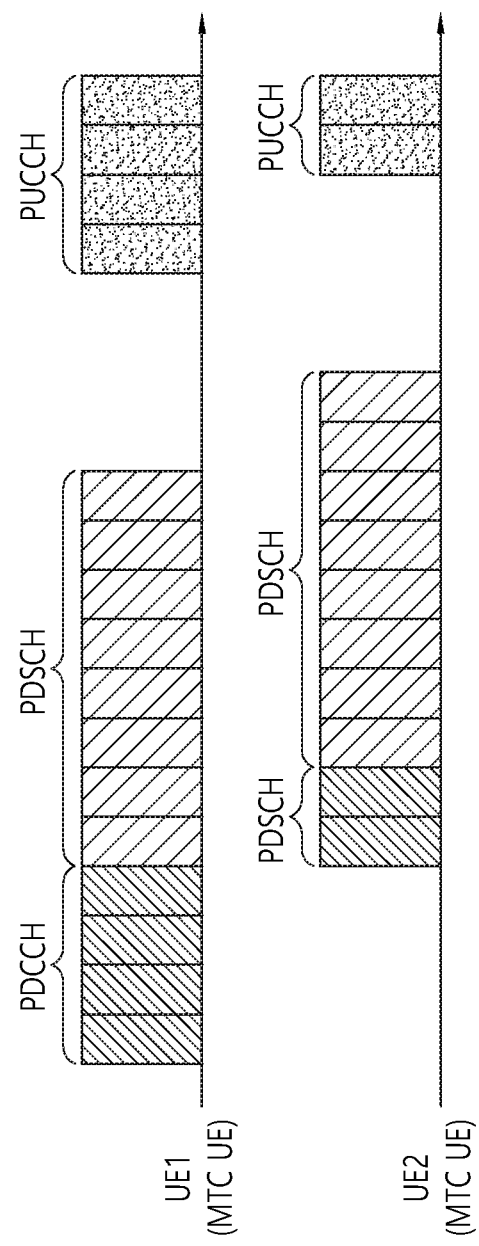
FIG. 17 illustrates a problem that two PUCCH resources overlap when (E)PDCCHs for two MTC devices have the same first (E)CCE.

FIG. 17 illustrates a problem that two PUCCH resources overlap when (E)PDCCHs for two MTC devices have the same first (E)CCE.

Referring to FIG. 17, although (E)PDCCHs for two MTC devices performing coverage extension are transmitted through different subframe regions, the two (E)PDCCHs may be transmitted with the same first (E)CCE. In this case, a problem that the two UEs need to transmit PUCCHs via the same subframe region may occur, in which case the same first (E)CCE is used for the two (E)PDCCHs, thus causing a collision between the PUCCH transmission resources.

Considering this problem, when a PUCCH for an MCT device needing coverage enhancement is transmitted using an implicit PUCCH resource, the resource for transmitting the PUCCH may change by each subframe while the PUCCH is repeatedly transmitted. The index of an explicit PUCCH resource in each subframe may be determined considering the following factors.

(a) PUCCH repetition index
(b) Index of (E)PDCCH transmission start subframe
(c) Number of (E)PDCCH transmission subframes and/or number of PDSCH transmission subframes
(d) UE ID (for example, C-RANTI)
(e) Index of (E)PDCCH candidate received by UE The index of an explicit PUCCH resource may be determined according to the index of an (E)PDCCH candidate received by the UE, which may be useful particularly when resources to construct one (E)PDCCH candidate may be set as resources in multiple subframes.

To determine the index of an implicit PUCCH resource in each subframe, a PUCCH resource for the UE may be determine according to (a), (b), (c), (d), and/or (e).

For example, the index of the implicit PUCCH resource may be set in view of an index (PUCCH repetition index, k) indicating how many times a PUCCH transmitted via a specific subframe is repeated as in (a). When a PUCCH is transmitted through subframes n to n+R, the PUCCH transmitted via subframe n has a PUCCH repetition index (k) of 0, the PUCCH transmitted via subframe n+1 has a PUCCH repetition index of 1, and the PUCCH transmitted via subframe n+2 has a PUCCH repetition index of 2. Here, as in a conventional method, defining the index of an implicit PUCCH resource set according to a first (E)CCE as PUCCH_resource ((E)CCE) and defining a subframe index as k, the index of a resource for transmitting a PUCCH for the MTC device needing coverage enhancement may actually be set as PUCCH_resource ((E)CEE)+k.

Figure 18:
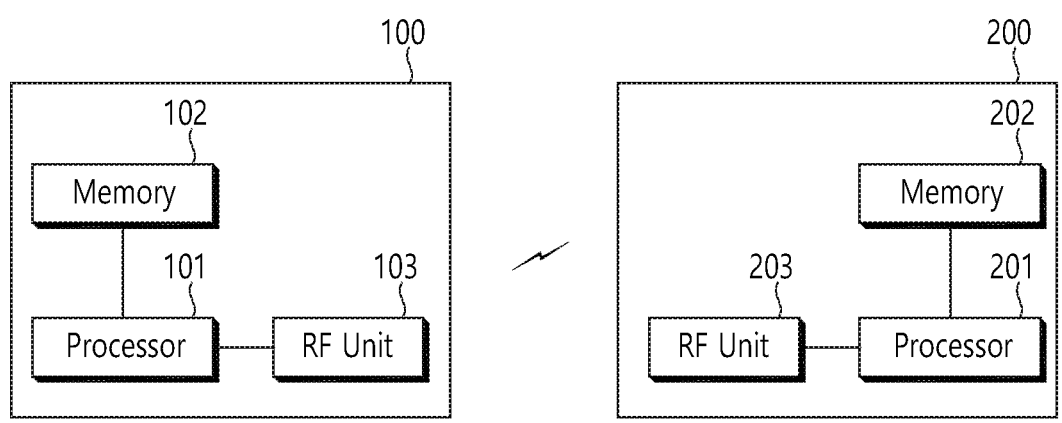
FIG. 18 is a block diagram illustrating a wireless communication system according to a disclosure of the present specification.

FIG. 18 is a block diagram illustrating a wireless communication system according to a disclosure of the present specification.

ABS 200 includes a processor 201, a memory 202, and a radio frequency (RF) unit 203. The memory 202 is coupled to the processor 201, and stores a variety of information for driving the processor 201. The RF unit 203 is coupled to the processor 201, and transmits and/or receives a radio signal. The processor 201 implements the proposed functions, procedures, and/or methods. In the aforementioned embodiment, an operation of the BS may be implemented by the processor 201.

An MTC device 100 includes a processor 101, a memory 102, and an RF unit 103. The memory 102 is coupled to the processor 101, and stores a variety of information for driving the processor 101. The RF unit 103 is coupled to the processor 101, and transmits and/or receives a radio signal. The processor 101 implements the proposed functions, procedures, and/or methods.

The processors may include Application-specific Integrated Circuits (ASICs), other chipsets, logic circuits, and/or data processors. The memories may include Read-Only Memory (ROM), Random Access Memory (RAM), flash memory, memory cards, storage media and/or other storage devices. The RF units may include a baseband circuit for processing a radio signal. When the above-described embodiment is implemented in software, the above-described scheme may be implemented using a module (process or function) which performs the above function. The module may be stored in the memories and executed by the processors. The memories may be disposed inside or outside the processors and connected to the processors using a variety of well-known means.

A terminal according to one disclosure of the present specification, which transmits a PUCCH, may include: an RF unit to receive a plurality of pieces of explicit configuration information on a PUCCH resource through higher-layer signaling when a PUCCH needs to be repeatedly transmitted on a plurality of subframes; and a processor to control the RF unit to determine a PUCCH resource for transmitting the PUCCH based on the plurality of pieces of explicit configuration information and to repeatedly transmit the PUCCH via the determined PUCCH resource on the plurality of subframes, wherein the PUCCH resource for transmitting the PUCCH may be determined based on at least one of a PDCCH, an EPDCCH, and an ID of the terminal, which are previously received.

Further, the previously received PDCCH or EPDCCH may be repeatedly transmitted on a plurality of downlink subframes according to a repetition level, the previously received PDCCH may be received by monitoring a plurality of PDCCH candidates, and the previously received EPDCCH may be received by monitoring a plurality of EPDCCH candidates.

Further, the PUCCH resource for transmitting the PUCCH may be determined based on a total aggregate resource (TAR) value for a PDCCH candidate from which the previously received PDCCH is retrieved among the plurality of PDCCH candidates, and the TAR value for the PDCCH candidate may be determined based on a repetition level and the number of resources per subframe for the previously received PDCCH.

Further, the PUCCH resource for transmitting the PUCCH may be determined based on the maximum TAR value for the plurality of PDCCH candidates, the maximum TAR value may be a TAR value having the maximum value among respective TAR values for the plurality of PDCCH candidates, and the respective TAR values for the plurality of PDCCH candidates may be determined based on repetition levels and numbers of resources per subframe respectively for the plurality of PDCCH candidates.

Further, the ID of the terminal may be a C-RNTI.

Further, the PUCCH resource for transmitting the PUCCH may be determined based on a location of a first CCE of the previously received PDCCH or a first ECCE of the previously received EPDCCH.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for a terminal to transmit a physical uplink control channel (PUCCH), the method comprising:
receiving a plurality of explicit configuration information on a PUCCH resource through higher-layer signaling when a PUCCH needs to be repeatedly transmitted on a plurality of subframes;
determining a PUCCH resource for transmitting the PUCCH based on the plurality of explicit configuration information; and
repeatedly transmitting the PUCCH on the determined PUCCH resource over the plurality of subframes,
wherein the PUCCH resource for transmitting the PUCCH is determined based on at least one of a PDCCH, an enhanced PDCCH (EPDCCH), or an identification (ID) of the terminal, which are previously received,
wherein the previously received PDCCH or EPDCCH is repeatedly transmitted on a plurality of downlink subframes according to a repetition level, the previously received PDCCH is received by monitoring a plurality of PDCCH candidates, and the previously received EPDCCH is received by monitoring a plurality of EPDCCH candidates, and
wherein a location of the PUCCH resource for transmitting the PUCCH is determined based on a maximum total aggregate resource (TAR) value for the plurality of PDCCH candidates, the maximum TAR value is a TAR value having a maximum value among respective TAR values for the plurality of PDCCH candidates, and the respective TAR values for the plurality of PDCCH candidates are determined based on repetition levels and numbers of resources per subframe respectively for the plurality of PDCCH candidates.

2. The method of claim 1, wherein a previously received physical downlink shared channel (PDSCH) is scheduled by the previously received PDCCH or EPDCCH, and the PUCCH comprises ACK/NACK information in response to the previously received PDSCH.

3. The method of claim 1, wherein the PUCCH resource for transmitting the PUCCH is determined based on a total aggregate resource (TAR) value for a PDCCH candidate from which the previously received PDCCH is retrieved among the plurality of PDCCH candidates, and
the TAR value for the PDCCH candidate is determined based on a repetition level and number of resources per subframe for the previously received PDCCH.

4. The method of claim 1, wherein the ID of the terminal is a cell radio network temporary identifier (C-RNTI).

5. The method of claim 1, wherein the PUCCH resource for transmitting the PUCCH is determined based on a location of a first control channel element (CCE) of the previously received PDCCH or a first enhanced CCE (ECCE) of the previously received EPDCCH.

6. The method of claim 1, wherein the PUCCH resource for transmitting the PUCCH is randomly determined based on a predetermined random sequence whenever a PUCCH transmission event occurs.

7. The method of claim 6, wherein the PUCCH resource for transmitting the PUCCH is maintained the same while the PUCCH is repeatedly transmitted on the plurality of subframes.

8. The method of claim 6, wherein the random sequence is determined based on a subframe index or system frame number (SFN).

9. The method of claim 6, wherein the random sequence is a random sequence initialized based on at least one of the PDCCH, EPDCCH, or ID of the terminal, which are previously received.

10. A terminal which transmits a physical uplink control channel (PUCCH), the terminal comprising:
a radio frequency (RF) unit to receive a plurality of explicit configuration information on a PUCCH resource through higher-layer signaling when a PUCCH needs to be repeatedly transmitted on a plurality of subframes; and
a processor to control the RF unit to determine a PUCCH resource for transmitting the PUCCH based on the plurality of explicit configuration information and to repeatedly transmit the PUCCH on the determined PUCCH resource over the plurality of subframes, wherein the PUCCH resource for transmitting the PUCCH is determined based on at least one of a PDCCH, an enhanced PDCCH (EPDCCH), or an identification (ID) of the terminal, which are previously received, wherein the previously received PDCCH or EPDCCH is repeatedly transmitted on a plurality of downlink subframes according to a repetition level, the previously received PDCCH is received by monitoring a plurality of PDCCH candidates, and the previously received EPDCCH is received by monitoring a plurality of EPDCCH candidates, and wherein a location of the PUCCH resource for transmitting the PUCCH is determined based on a maximum total aggregate resource (TAR) value for the plurality of PDCCH candidates, the maximum TAR value is a TAR value having a maximum value among respective TAR values for the plurality of PDCCH candidates, and the respective TAR values for the plurality of PDCCH candidates are determined based on repetition levels and numbers of resources per subframe respectively for the plurality of PDCCH candidates.

11. The terminal of claim 10, wherein the PUCCH resource for transmitting the PUCCH is determined based on a total aggregate resource (TAR) value for a PDCCH candidate from which the previously received PDCCH is retrieved among the plurality of PDCCH candidates, and the TAR value for the PDCCH candidate is determined based on a repetition level and number of resources per subframe for the previously received PDCCH.

12. The terminal of claim 10, wherein the ID of the terminal is a cell radio network temporary identifier (C-RNTI).

13. The terminal of claim 10, wherein the PUCCH resource for transmitting the PUCCH is determined based on a location of a first control channel element (CCE) of the previously received PDCCH or a first enhanced CCE (ECCE) of the previously received EPDCCH.

* * * * *